(12) United States Patent
Herz et al.

(10) Patent No.: US 10,475,100 B1
(45) Date of Patent: Nov. 12, 2019

(54) ONLINE MARKETING SERVICE SYSTEM

(75) Inventors: Frederick S. M. Herz, Milton, WV (US); Bhupinder Madan, Basking Ridge, NJ (US); Adena Harvey, Milton, WV (US)

(73) Assignee: Fred Herz Patents, LLC, Davis, WV (US)

( * ) Notice: Subject to any disclaimer, the term of this patent is extended or adjusted under 35 U.S.C. 154(b) by 182 days.

(21) Appl. No.: 13/546,829

(22) Filed: Jul. 11, 2012

Related U.S. Application Data

(60) Provisional application No. 61/506,547, filed on Jul. 11, 2011.

(51) Int. Cl.
*G06Q 30/06* (2012.01)
(52) U.S. Cl.
CPC .............. *G06Q 30/0629* (2013.01)
(58) Field of Classification Search
CPC .............. G06Q 30/08; G06Q 30/06–08
USPC .............. 705/26.1–27.2
See application file for complete search history.

(56) References Cited

U.S. PATENT DOCUMENTS

| | | | | |
|---|---|---|---|---|
| 8,170,919 B2* | 5/2012 | Barbour et al. | ............. | 705/26.1 |
| 8,244,599 B2* | 8/2012 | Sundaresan | ................. | 705/27.1 |
| 8,392,290 B2* | 3/2013 | Rehman et al. | ............. | 705/26.9 |
| 8,554,601 B1* | 10/2013 | Marsh | .................... | G06Q 30/02 705/7.32 |
| 2009/0063247 A1* | 3/2009 | Burgess | ................. | G06Q 30/02 705/7.34 |

OTHER PUBLICATIONS

How a Search Engine May Measure the Quality of Its Search Results, Bill Slawski, Sep. 20, 2011, available at: http://www.seobythesea.com/2011/09/how-a-search-engine-may-measure-the-quality-of-its-search-results/ (Year: 2011).*

* cited by examiner

*Primary Examiner* — Ming Shui
(74) *Attorney, Agent, or Firm* — Schwegman Lundberg & Woessner, P.A.

(57) ABSTRACT

An online marketing system assists vendors to sell their products to system users by providing a database of unbiased and untainted rated reviews of diverse set of products. The queries by the users are searched by a proprietary search engine and ranked based on the reviews and the reputations of the respective reviewers for accuracy.

11 Claims, 25 Drawing Sheets

ONLINE MARKETING SERVICE SYSTEM

CROSS REFERENCE TO RELATED APPLICATION

This application claims priority to U.S. Provisional Application No. 61/506,547 filed Jul. 11, 2011.

TECHNICAL FIELD

The present invention relates to an online marketing service system that enables users to search for products or services based on unbiased recommendations and to incentivize the users to provide their own recommendations based on products they purchase.

BACKGROUND

Conventional search engines generate revenue by charging for advertising and for popularity rankings in connection with key words. Also, search engines traditionally are programmed to rank websites based on their popularity and relevancy. In fact, empirical studies indicate various political, economic, and social biases in the information they provide not to mention what results happen to be most popular at the time and/or are most heavily advertised generally or through the search engine itself. In other words, these biases could be a direct result of economic and commercial processes (e.g., companies that advertise with a search engine can become also more popular in its organic results). Political influences biasing search results may also occur.

While the process and methodology to determine rank is specific to each search engine (the "best" results are relative to which criteria the search engine values and provides in its unique or proprietary algorithm), the overall search engine process is very similar from one search engine to the next. The usefulness of a search engine depends on the relevance of the result set it gives back. While there may be numerous pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another. In traditional Web searches, the methods also change over time as Internet usage changes and new techniques evolve and as new and unsolved problems evolve as is the case with consumer search requiring peer scrutiny opening up a niche for the current inventive system merging consumer search, social/reputational search and social commerce. An alternative approach is desired that allows search rankings to instead be based on, for example, the quality of products to be purchased as a result of the search. The present invention addressed this need in the art.

SUMMARY

The present invention is a proposed solution to the following question: In the world of online commerce, how does a consumer get the best product or services from a company when a mechanism to see the product in person, to receive a demonstration or a test drive of the product, or to experience how a company handles giving services cannot be achieved?" The invention enables a quality based search of reviews of products and companies for the consumer in order to assist the consumer in making the best possible decisions.

The invention relates to a system and associated method for providing rating information to customers concerning products and services available for purchase. The method includes the steps of providing an interface through which customers may initiate a search for products and services and view reviews of the products available for purchase or companies providing services, processing search results for display with a ranking based on product reviews, company services, social conscience factors, and other factors the consumer deems important of the products or services in the search results, and requesting reviews from the customers regarding the quality of any purchased products or services as well as the quality and accuracy of any reviews relied upon in making a product or service purchase. Preferably, the reviews of the quality and accuracy of any reviews relied upon in making a product/service purchase are used to update a reputation rating of a user that provided the review that was reviewed by the purchaser. The product rating is adjusted by the company's rating based on the consumer dictated factors that have been used to calculate a company's overall score. Also, the product, service, and company ratings are preferably weighted based on the reputation ratings of the reviewers.

In an exemplary embodiment of the invention, a system (a.k.a. WiseOwl) is provided that provides information to consumers so that they may make informed decisions to buy the best quality products or services from online vendor's sites. WiseOwl is a business that serves the retailer and vendors of diverse sets of products and services and other similar businesses. WiseOwl assists its clients to sell their products to the public through the Woddles website and advertise their services through WeAreYours for a small fee. The WiseOwl website assists its clients by introducing its own users to clients' products by providing its users with trustworthy, unbiased, and untainted information about various products in order to assist them in identifying the best quality products that are available in the market. The Woddles module user then is able to make an informed decision as it buys one of the products from all the similar products that are reviewed on the Woddles module. The reviews of products in fact rate the products in each category and sub-category providing a product score. Respectively, the WiseOwl website allows users to make informed decisions about services offered by companies, and companies themselves, by offering a composite view of the where the company stands on a variety of social conscious issues, political issues, and other factors that are deemed important by users through the WeAreYour module. The investigation of companies and reviews of their services are used to create a company score in the WeAreYour module—which is also used to update a comprehensive score also at the product level, namely "product value" score in Woddles. The WiseOwl website also provides assistance to its users in a manner that leads to an increase in the sales of diverse retail products because the website's user base is diverse on many parameters. The quality of the products or services is the primary basis for the rating criteria in most cases in the selection of reviews of the products or services. However, the quality of the products as rating criteria can be replaced by the bargain value of the product/service and hence the search algorithm can provide assistance to the users in more than one way. The information provided to the websites' users is trustworthy because the information is peer rated. The trustworthy information provided to its users is made available by a search menu interface based on technology that maintains the integrity of the peer rated information in the Woddles/WeAreYours.com website.

In the WiseOwl product and service review search system, an economic incentive system is also provided to incentivize behavior of users who are capable of significantly enhancing the accuracy and overall performance of the current system. For example, in the WiseOwl consumer product/service review search implementation, incentives rely primarily upon a percentage (commission) of the actual sale of the product to which the review pertains and to which the writer is entitled (as the link on the search results, product review or product page leads to the corresponding product page and/or purchase form). In much the same way that Google Ad Words is designed, "most-expensive real-estate" is the link constituting the very first result pages (and closest to the top). Likewise, in the present implementation, the incentivization to drive search users to utilize (or obtain) their expert knowledge in the form of quality or value based recommendations is economically driven by the fact that the reviews containing the best recommendations will ultimately end up on the top of the search results ranking (as proven by peer user ratings). Put another way, the advice which ultimately ends up being the most valuable advice tends to end up the closest to the top of the result rankings because of the resulting purchase click throughs and thus ends up getting economically rewarded appropriate to its quality. Because users are entitled to receive a percentage of revenues which are directly associated with results which they successfully recommended and thus were able to get placed in the search ranking, for example, in association with a given query, reviews will ultimately be (potentially handsomely) economically incentivized to make good quality, accurate product or service recommendations (or to become expert enough in certain product category/search domains to be able to provide them). For product or service categories/queries which are more popular than others, the incentive to provide such superior quality recommendations will be greater, but also so will be the level of competition. All in all, if this commission structure (compensation from corresponding user purchase click through) is sufficiently compelling, there should be adequate incentive structure to drive reviewers to provide superior and potentially unprecedented quality product or service recommendations across all reasonably worthwhile popular or interesting product/service domains.

At a paradigmatic level, if the business model which is supported by the proposed scheme functions efficiently, it will become a great equalizer in that by creating a marketing environment which is neutral, representing (advocating for) the customer it will create a more efficient consumer marketplace. By tending to move marketing more into the consumer realm, it will become increasingly incumbent upon product and service companies to focus more exclusively upon better quality and better value to their customers as opposed to traditional marketing tactics geared heavily toward capitalizing upon greater marketing and branding image than their competitors. This is attributable in large part to the fact that consumer oriented marketing as herein proposed will be geared primarily toward truthfulness and accuracy in addition to quality and effectiveness (through the consumer competitive element).

BRIEF DESCRIPTION OF THE DRAWINGS

Exemplary embodiments of the invention will be described in conjunction with the associated figures, of which.

DETAILED DESCRIPTION OF ILLUSTRATIVE EMBODIMENTS

Figure 1:
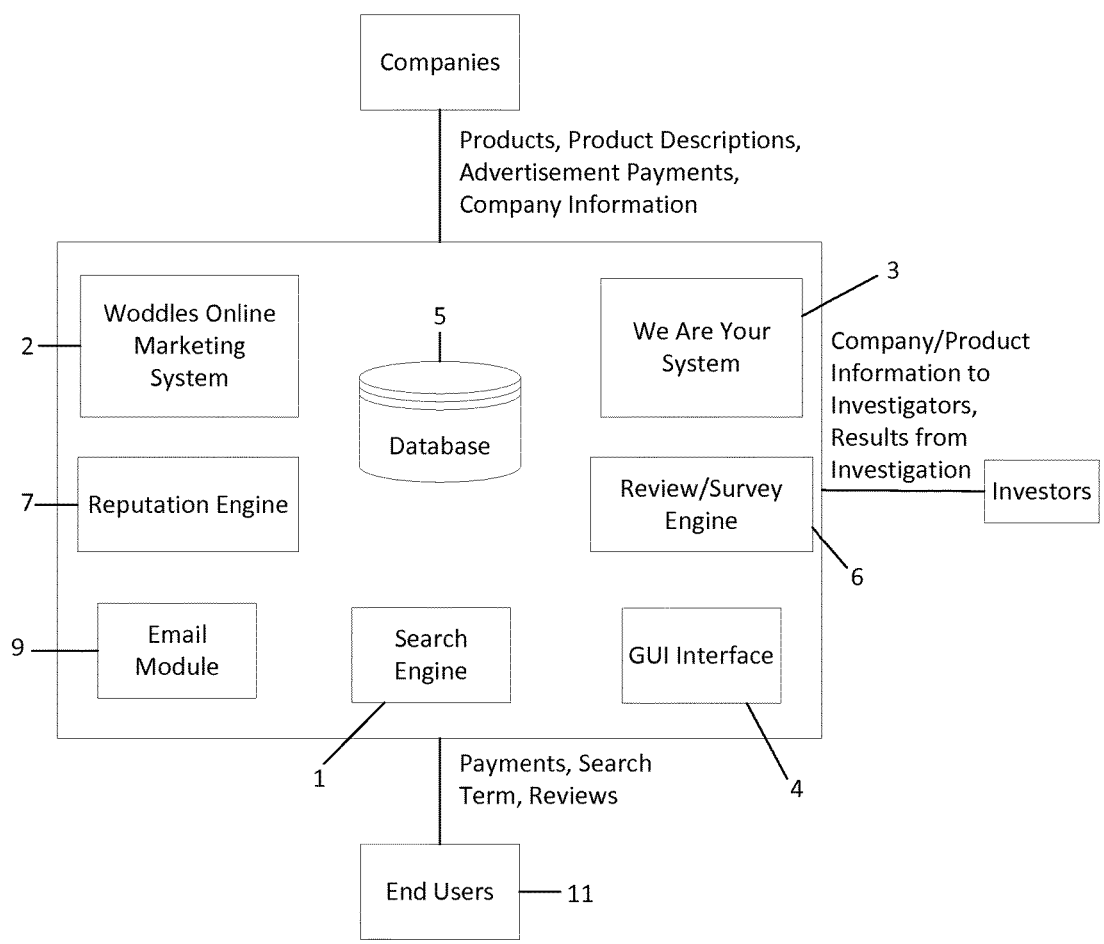
FIG. 1 is the parent diagram relating the user and company to the online system of invention.

Certain specific details are set forth in the following description with respect to FIGS. 1-24 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

The WiseOwl website described herein assists its clients by introducing its own users to clients' products and services by providing its users with trustworthy, unbiased and untainted information about and ratings of various products or services in order to assist its users in identifying the best quality products and services that are available in the market. WiseOwl website user then is able to make an informed decision as it buys one of the products or services from all the similar products that are reviewed on Woddles module or similar services reviewed on WeAreYours module of the WiseOwl system. The reviews of products in fact rate the products/services in each category and sub-category. The information provided to the websites users is trustworthy because the information is peer rated. The trustworthy information provided to its users is made available by a search menu interface as will be described further below.

By way of overview, the invention is a system that provides users with an intelligent learning search engine that uses other users' purchases and ratings to determine the best match for a specific search term that would create a high level of user satisfaction. The invention includes a way for the users to purchase the item at the time of decision, either through a pass through to the vendor sites or its own shopping cart or the service via pass through to the vendor site. This creates a centralized place where users can be guaranteed to find the best match for what they are looking for and purchasing it when the user sees it. The user will also be asked to view ratings by other users and to rate how helpful that rating was to their purchase decision and overall satisfaction with the product. The feedback by consumers will help to teach the intelligent learning search engine to give a better match to consumers for items. Users would be encouraged to use the system as it includes a reimbursement to users that provide a useful rating on the product, service, or company.

In accordance with an aspect of the invention, the user would either pass through to the vendor's website to purchase a service or an item or use the Woddles shopping cart to purchase the item. If a Woddles shopping cart is used, a macro would be included to purchase the item from the vendor's website. An expansion of this module would include Woddles virtual money for purchases through Woddles, virtual lottery tickets, and/or a virtual loyalty card program, similar in nature to UPromise which also ties into the existing credit cards or store identifier card and credits the users virtual lottery card account (distinguished from the charitable account in UPromise), for both on-line and off-line purchases in which such off-line purchases can be tracked and matched via a common user identifier to a previous corresponding review(s) the user read on-line in order to thus enable the writer of that review to receive economic consideration for originally motivating the buyer to make the purchase.

The WiseOwl system also has basically refined the two traditionally foundational criteria for search in general, namely, popularity and relevancy (particularly to the query) to develop a new paradigm in consumer products or services. While relevancy to the user query (or as in social search to the context of the user him/herself) is a helpful and meaningful search objective to achieve, at a high level, in WiseOwl consumer search, more optimal criteria for search is established. Namely, through the scrutiny of unbiased, peer review and empirical data, the WiseOwl system seeks to instead emphasize "quality"—quality of the product or service recommended and quality (sales effectiveness) of the review recommending the product or service. The preferred embodiment of WiseOwl is based upon a proprietary search ranking algorithm, for the Woddles and WeAreYours modules respectively, expressed in more detail below.

FIG. 1 is the parent diagram relating the user, the companies, and the investigators to the online system. In the online system illustrated in FIG. 1, a search Engine module (1) creates a query for the database module (5) and finds and returns all items matching the search criteria specified by the user (11). These results are sent to the Woddles Online Marketing module (2) if the return is items, and the results are sent to the WeAreYourSystem module (3) if the return is services. Both of these modules will return the results in a specific order to the GUI Module (4), which is then set to interface with the respective module for the following views. The user (11) can choose an item based upon the display of items and/or services with user reviews.

The display is determined within the Woddles module or the WeAreYourSystem module (3) which both use a sophisticated ranking engine (separate formulas for each determine the display). In one preferred embodiment, it is useful to consider the fact that certain categories of products and services are more personal preference oriented than others. It is particularly useful then to consider using a collaborative filter particularly if the range of item or service selection is large. Collaborative filter more generally is illustrative of possible predictive statistical or adaptive learning methods including pattern matching, clustering methods and the like. The output of the collaborative filter would thus be another weighted function to the standard formula for effective product, company, and service ranking R used for the Woddles and WeAreYourSystem modules. Suggested for such system are use of attributes of users and preferably that of the subject items. In another variation, the collaborative filter could be used to find the reviewers whose preference profiles both closely match (based on similarity distance) to the current user. In this case, in the effective review ranking RR=m1* (the product or service effective ranking (R)+2* (review score). In this case review score=*n (distance of user profile to reviewer profile+R_0 such that reviewers providing the review score are preferentially selected if they are most similar to the user profile. For example, if a 21 year old male adrenaline junkie was seeking a car and a single mother of 2 was seeking a car, the collaborative filter would find the cars with the best reviews by other single mothers for the single mother and the cars with the best reviews by other 18-21 year old adrenaline junkies for the 21 year old male.

The Database Module (5) stores a variety of items for operation of the system of the invention. For example, the Database Module (5) may store and retrieve items or services matching the search criteria from the Search Engine (1) query. The initial recommender ID, User ID, product ID or service ID, reviews of products/services/companies are also stored in the database (5). Each company has a company score calculated in the WeAreYourSystem module (3) by a variety of factors that can influence users (11) to purchase products from that company or use services offered by the companies. This company score is accessed by the Woddles module (2), in conjunction to the ratings of the product/service and the reputation of the raters, to calculate a product score for the users.

After the user (11) purchases a product or uses a service, the Email Module (9) generates and sends an email to the user (11) with a hyperlink to the Survey Module (6). Then the user ID and product ID or Service ID are sent to the Survey Module (6). The Survey Module (6) retrieves reviews for the product purchased or the service used and displays these reviews to the user (11) to rate the accuracy and helpfulness of the reviews. The review writer's ID and rating are sent to the Reputation Module (7) and the process is repeated until the user (11) does not wish to rate any more reviews. The Survey Module (6) may also be used to ask the user (11) to rate products as to their quality and companies as to their business practices that can influence users (11) to use their products/services.

The Reputation Module (7) provides a mechanism for ranking product/service/company reviews by creating new data that is then used to rerate the customer's weighted ranking based on the reputation of the rater for accuracy and helpfulness. A certified user starts with the highest weighted value possible, and a non-certified user starts with the base weighted rating of 1. The reputation of a customer is based on the number of initial click throughs to Woddles, the number of purchases made through click through, and other user's reviews of the accuracy of their review of product/service/company. The determined reputation ranking would affect all of the companies, products, and services that the user or investigator had rated up to the present time and into the future. The user's original reputation rating would be retrieved from the database (5) for storage.

Figure 2:
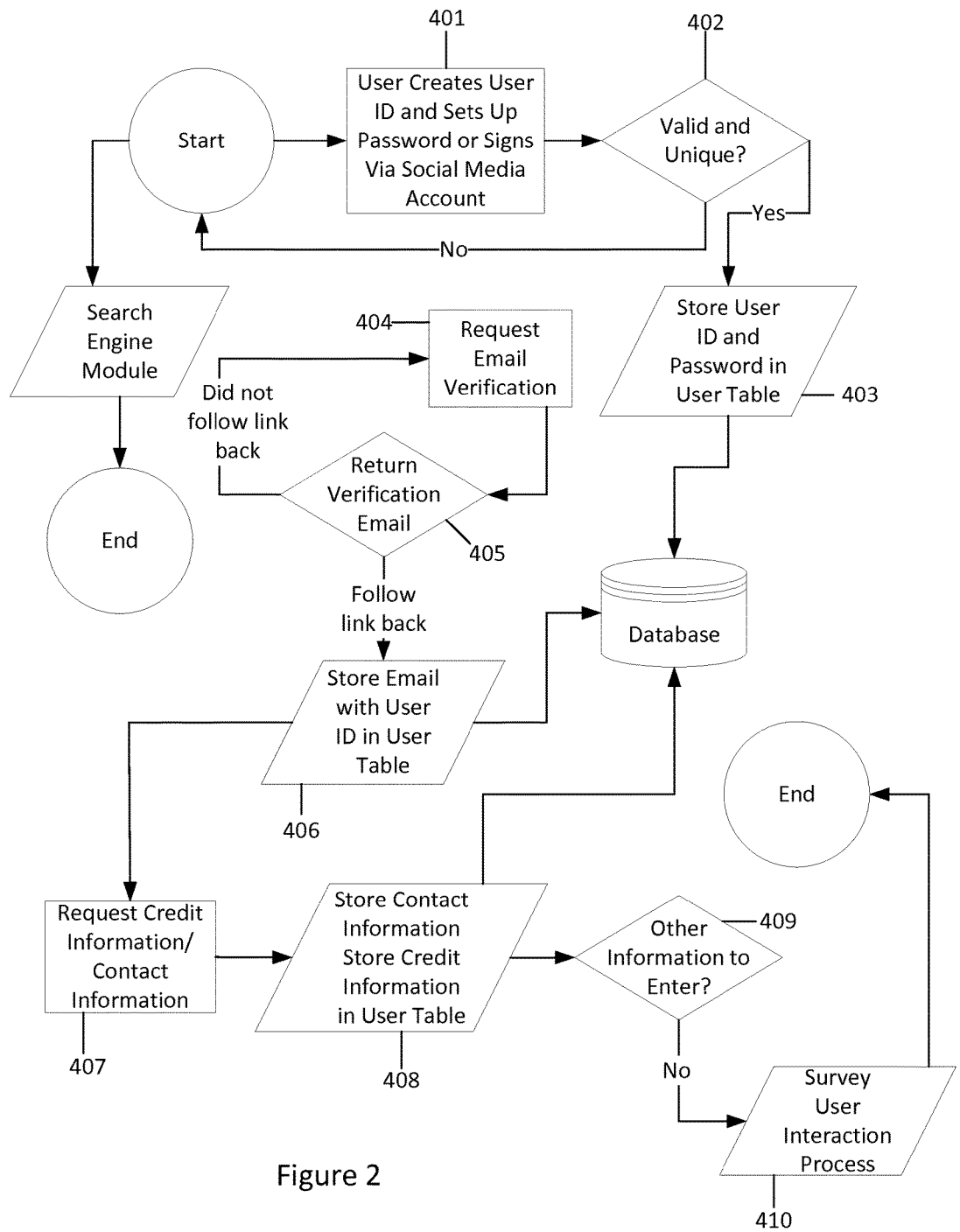
FIG. 2 illustrates the user's initial visit to WiseOwl Website.

FIG. 2 illustrates a user's initial visit to the WiseOwl website. Secure socket layers would be implemented for the user (11) when entering their identification information at the beginning. At this point they can use the search engine (1) without signing in, though they would not be able to rate any product or review unless they have created an account. At step 401, an account is created, and the user (11) would select an ID and a password or link their social media account to create an account (giving the WiseOwl system access to their information on their social media account). The GUI Module (4) checks if these are valid and unique in step 402. If they are, then they are stored in the database (5) at step 403 in the user table. The user ID is a unique field that connects the user table to other tables and is necessary for the transfer of information. If these are not valid, the user (11) is sent back to create an ID and password that are valid. In step 404, an email is sent to the user (11) to verify correct contact information with a link to follow back to the site at step 405. If the user (11) follows the link back, the email address is verified and the contact information is stored at step 406 in the database module (5). At step 407, the user (11) then submits basic contact information and financial information for reimbursement for reviews that affect other user's decisions. At step 408, this information is stored with the user ID in the database module (5). At step 409, the system determines if there is any other information to enter. If there is, the GUI Module (4) returns to step 407 and repeats until there is no other contact or credit information to enter. The user is then transferred to the Survey User Interaction Process 410, at which point this process ends.

Figure 3:
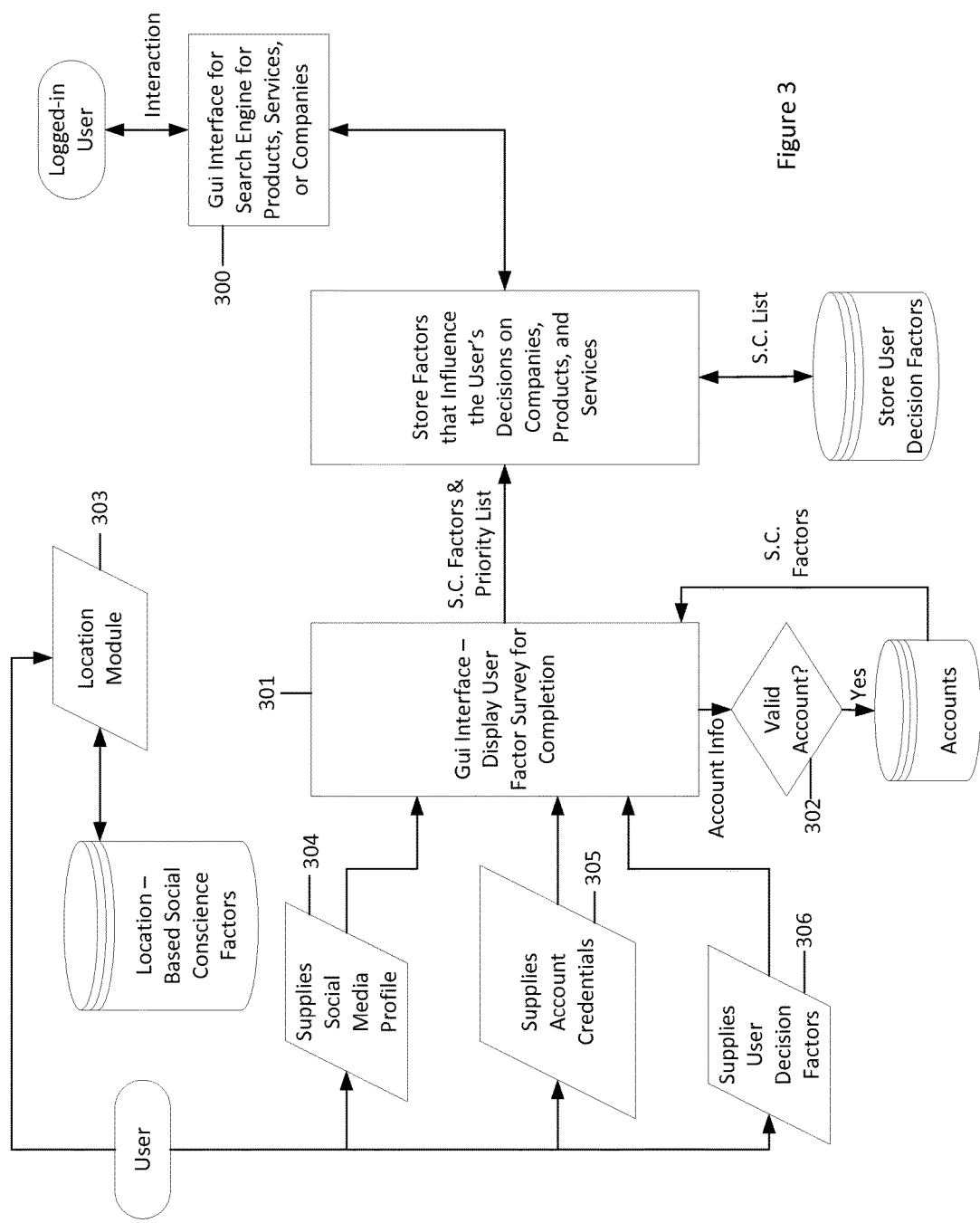
FIG. 3 illustrates the Survey User Interaction Module which builds the table of user selected values that influence their decisions on product, services, and companies.

FIG. 3 illustrates the Survey User Interaction Process. The user signs into WiseOwl and receives a request to complete a survey that will improve their search results. The GUI Interface displays the survey for user factors that can help influence their decisions for products, companies, and services. The system simultaneously checks the user's location and loads factors that are common for certain local areas. These user factors are stored with the user id to assist the Woddles and WeAreYourSystem Ranking engines in determining the display results for the users. The user table preferably includes fields such as demographic data, geographic data, and/or other personal information. Additional related fields may also include user credentials such as credibility and reputation variables with respect to the Woddles service in as much as credibility and reputation equity are important both from the standpoint of prescreening and assurance that the user has not committed fraud such as review/ratings which have been secretly "bought." The user table stores information describing the user to other users.

Figure 4:
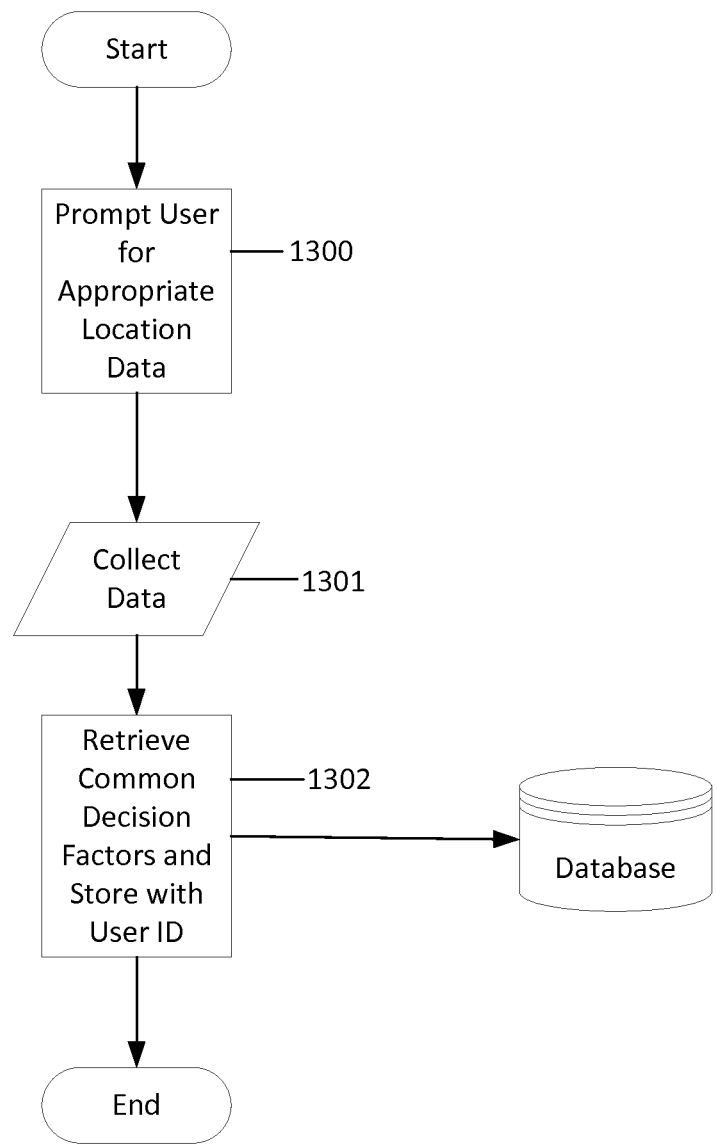
FIG. 4 illustrates the Location Module, a part of the Survey User Interaction Module, that takes values that are common for the area the person lives in and automatically adds this data to the user factor table.

FIG. 4 shows how the user is prompted to provide the appropriate location data. Once this is provided the system retrieves the common factors associated with the location and stores these with the user ID.

Figure 5:
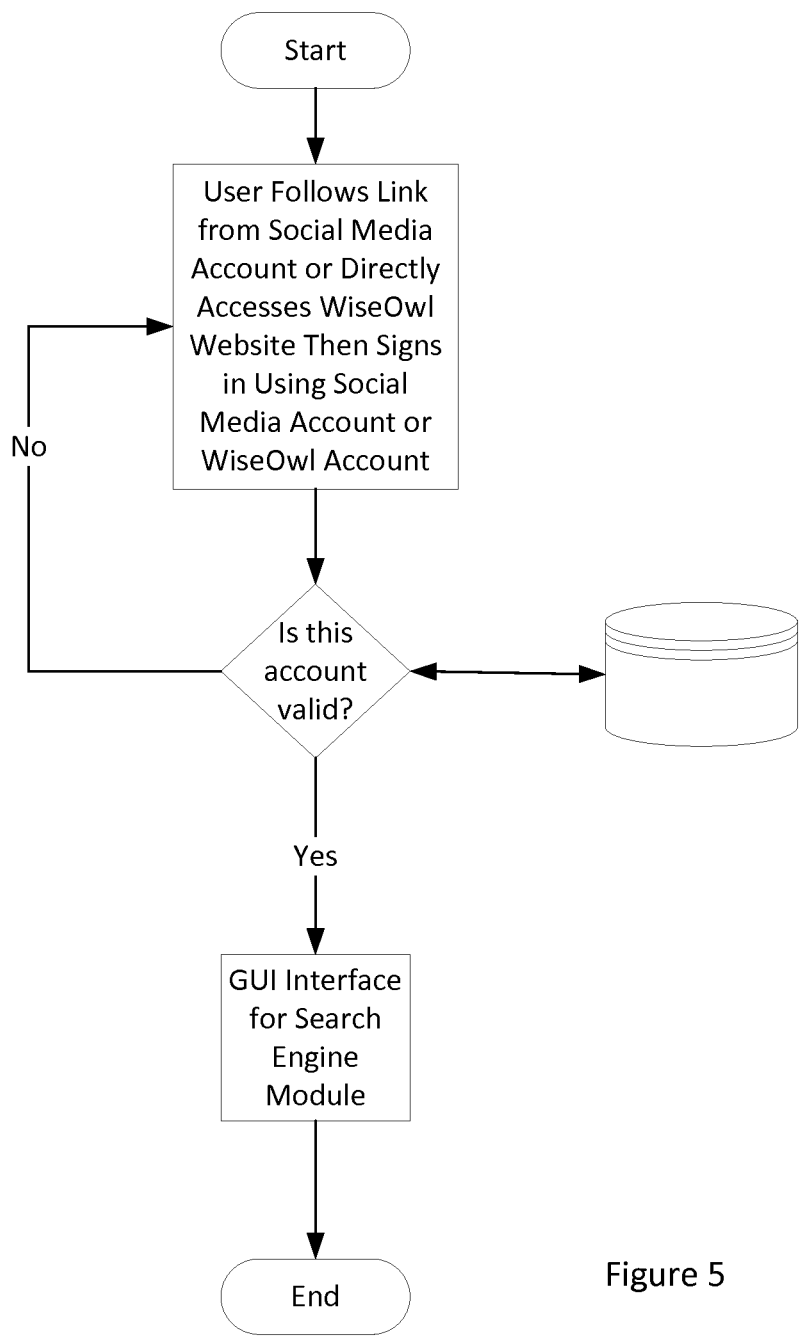
FIG. 5 illustrates how to Sign into WiseOwl for purpose of using the Search Engine.

FIG. 5 demonstrates how a registered user of the WiseOwl website, or connected via a social media account, and is returning to the WiseOwl website, the user (11) goes to the WiseOwl website and enters their ID and password. The user ID and password combination are checked against the user table in the database (5). If valid, the user (11) is passed on into the website. If not valid, the user (11) is returned to the log in screen.

Figure 6:
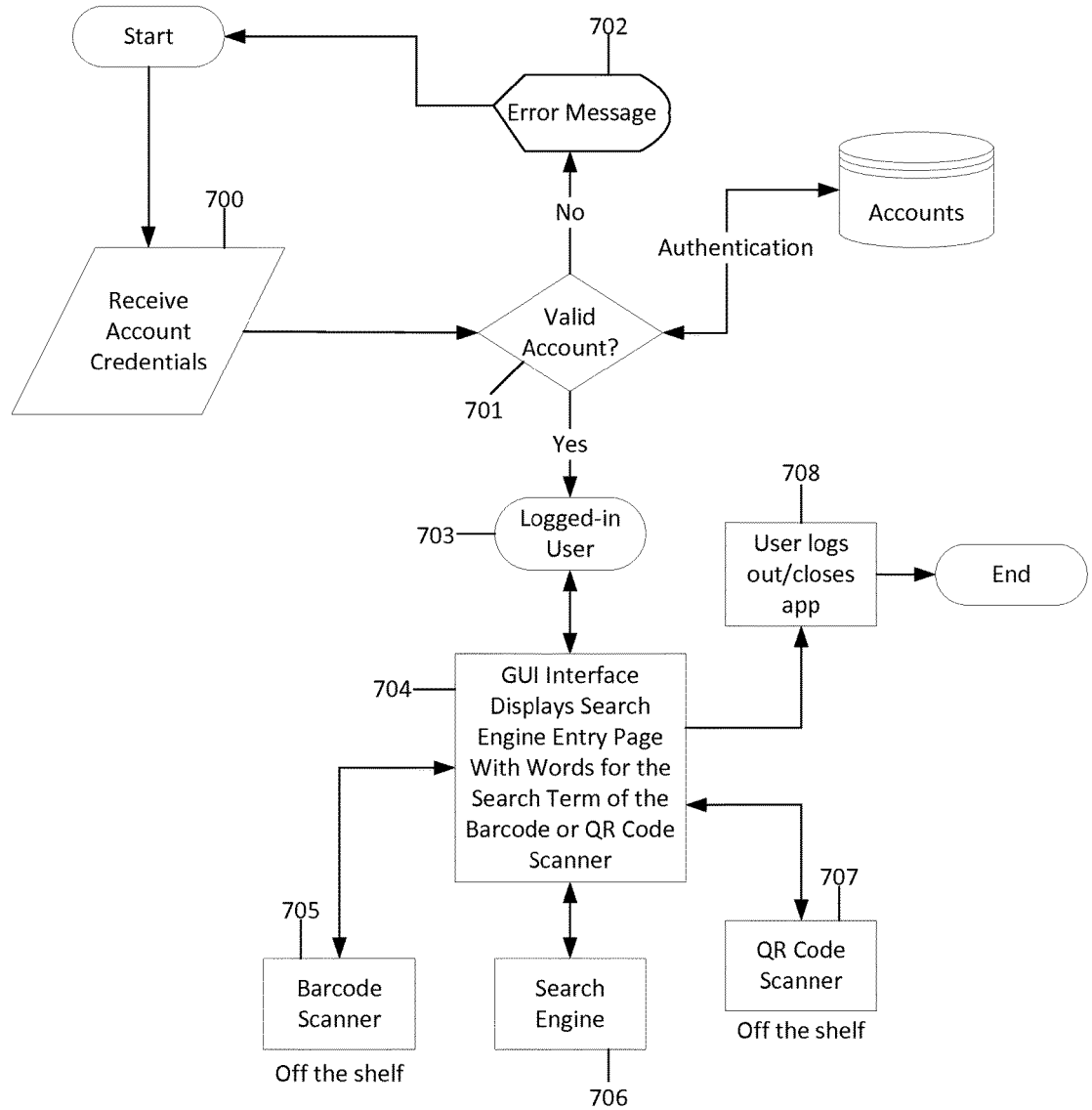
FIG. 6 illustrates how the mobile module will interact with the WiseOwl online system.

FIG. 6 shows the mobile module for accessing the WiseOwl system. A user has an option of registering their phone with WiseOwl, or can have an application downloaded for their phone allows them to stay signed into WiseOwl after initial use. The phone module can accept a scan of a product barcode or QR code as the search parameter. Alternatively the user can access their WiseOwl account via web access from their smartphone and enter a search term, at which point they are transferred to Woddles or WeAreYourSystem module to rank the search results for the user to view via the GUI Module. The QR code could be associated with anything from a product label in a retail store where the online review(s) are displayed (e.g. in conjunction with other product, price, or discount/promotion information) to a print version product advertisement in which review and/or online product purchase option is presented (as well as many other options).

Figure 7:
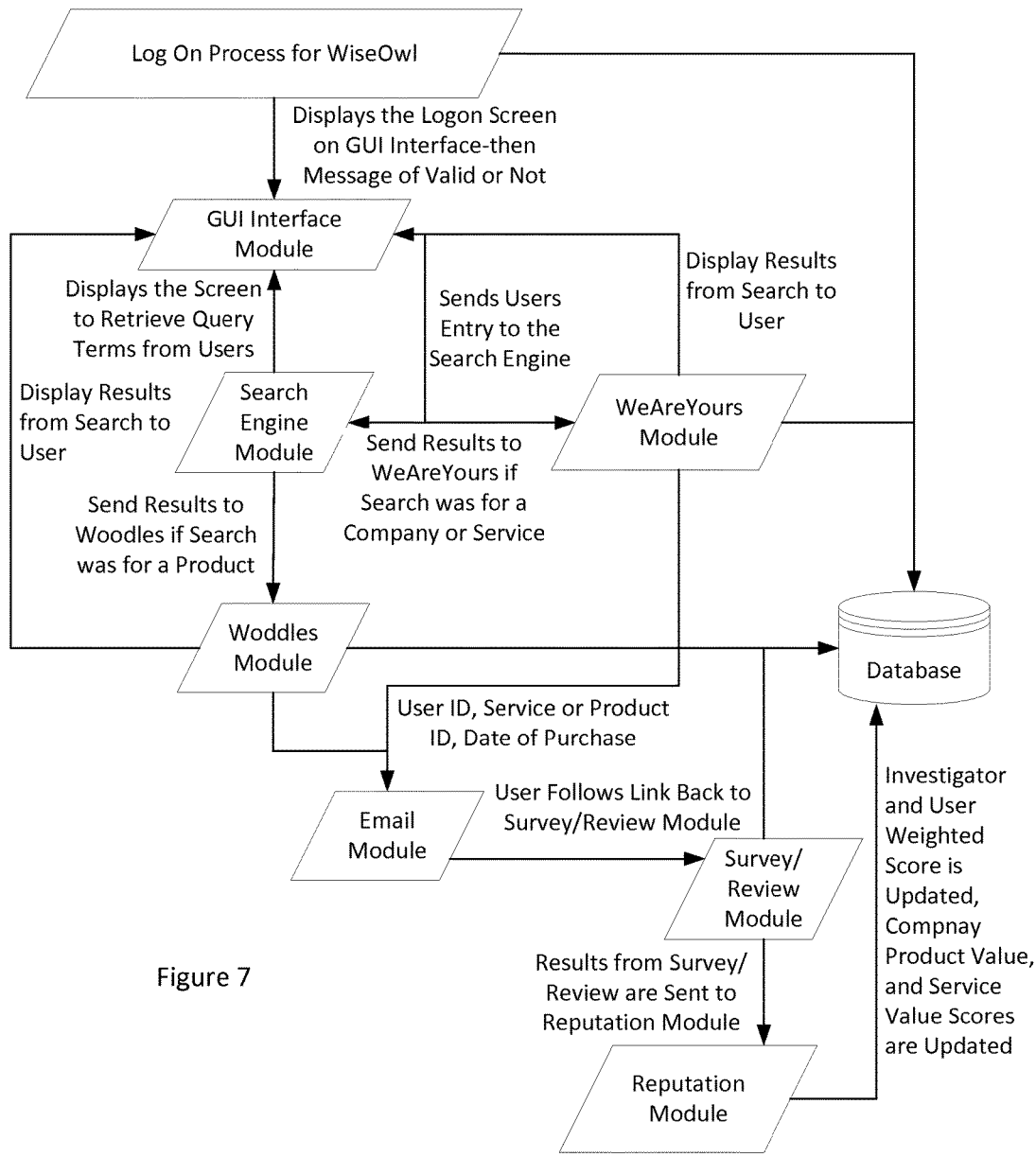
FIG. 7 illustrates the relationships of the WiseOwl modules to each other and the flow of information through the modules.

FIG. 7 shows the overall flow of information inside the WiseOwl system.

Figure 8:
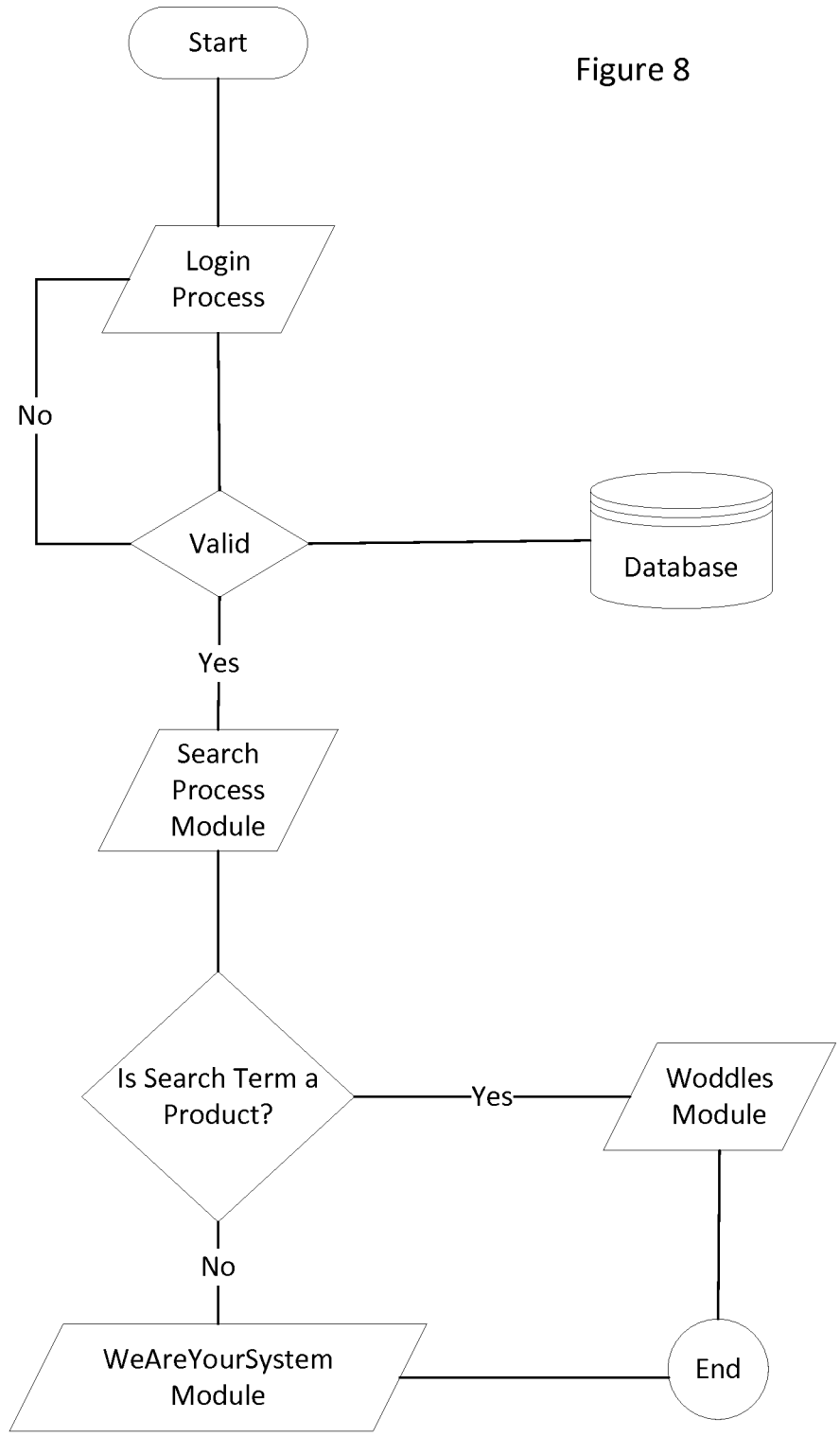
FIG. 8 illustrates what modules are initially used by the user from the search module through the display/GUI module.

FIG. 8 illustrates the flow of information through the system from the users' (11) point of view. The user (11) logs in (see FIG. 2, 4, 5, or 6) to the online system. The system checks this logon information against the database module (5). If it is not valid, the user is returned to the login screen and a display is sent that the previous logon was invalid, please re-enter. If the log on is valid, then the user 11) is shown, via the GUI Module (4), a request for searching a company, service, or product. When the user (11) enters the query specifications, the system checks to see if the query request was for a product. If the query request was for a product, then the Search Engine Module will conduct a search for the product/type of product and transfer the information, and user (11) to the Woddles Module. If the query request was not for a product, then the Search Engine Module will conduct a search for the company/service and transfer the information, and user (11) to the WeAreYour Module. As part of the business model, specific domain names (such as weareyourcarinsurance, weareyourphysician, etc.) are purchased and set to forward users who type these domain names in to the WiseOwl web interface system automatically.

Figure 9:
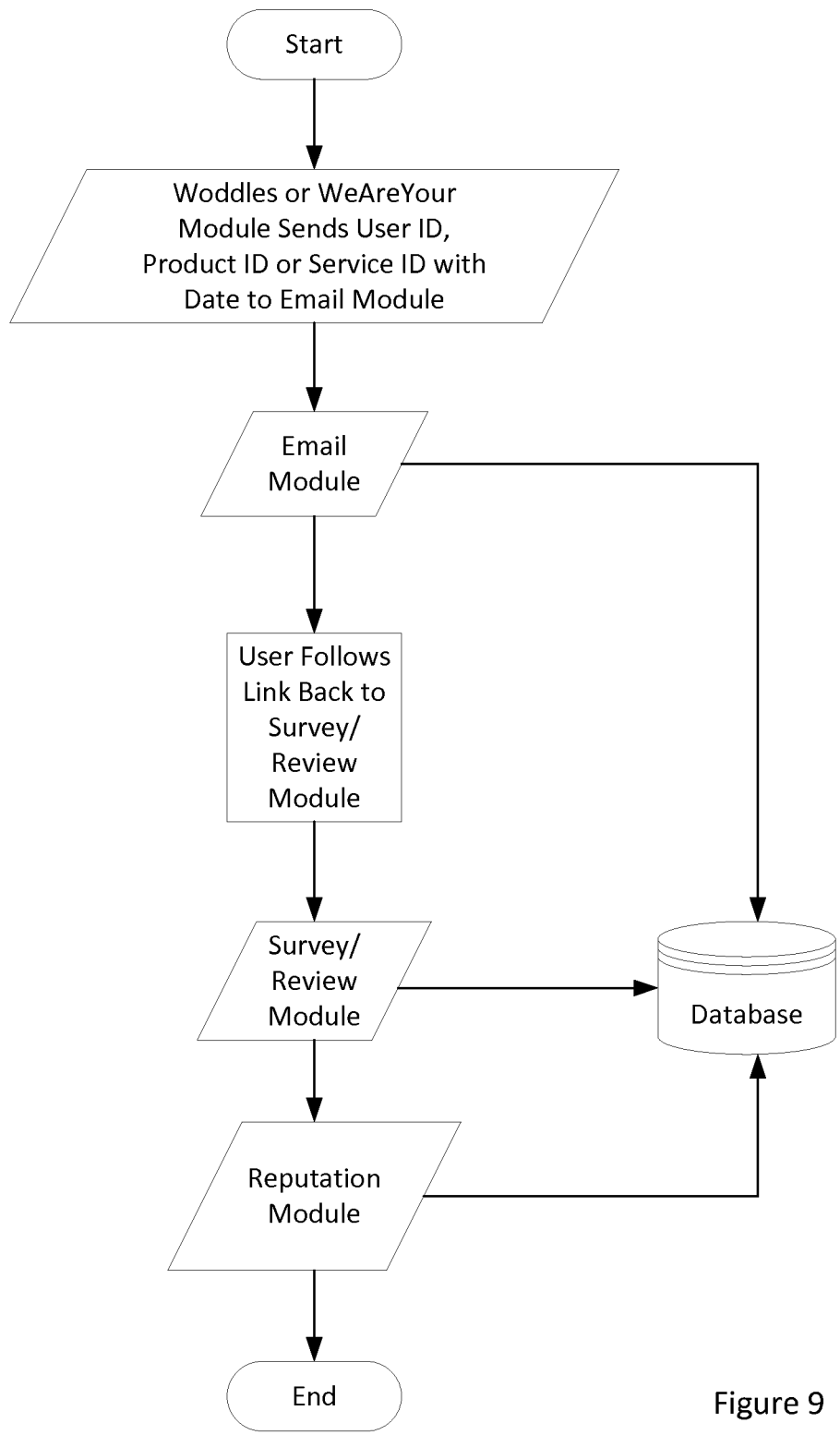
FIG. 9 illustrates the modules that interact with the user after a period of time from use of the system shown in FIG. 8.

FIG. 9, After Purchase of Service or Product, illustrates the way the system interacts with the user after a product/service is purchased/used. The online system's Email Module will retrieve the user's ID, Product ID or Service ID, and User Email. The Email Module will generate an email to user (11) requesting them to complete a survey and include a hyperlink to the Survey Module. The system checks each week, for 3 weeks, to see if a survey has been completed. If not, then the user (11) is sent a reminder. After the third week, the system marks the survey as void or user as uninterested. If the user responds, the results from the Survey Module are sent to the Reputation Module so that a user's reputation (or weighted score) can be updated. The results of the Reputation Module are sent to the Database Module.

Figure 10:
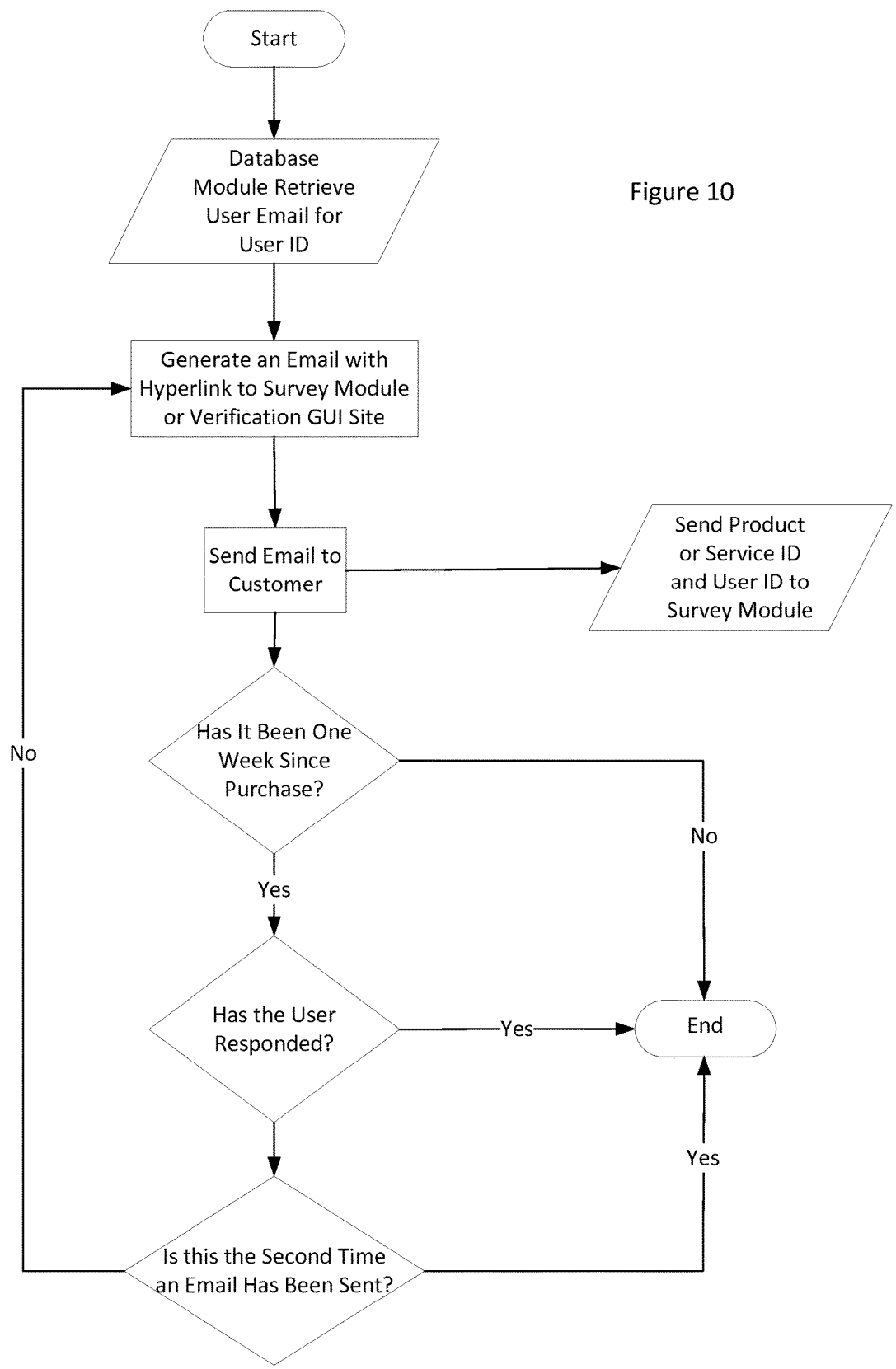
FIG. 10 illustrates the email module and how it operates.

FIG. 10 is the Email Module which illustrates the operation of the email module (9) of the invention. In step 301, a macro in the database (5), which is activated when a new line item is entered into the purchase table, sends the user ID, product or service ID, and email address to the Email Module (9). An alternative way to activate the Email Module (9) is for the GUI (4) to send a user ID and email address to the Email Module (9) at step 302 to verify it is an accurate and current account (as indicated in FIG. 2). When this information is received by the Email Module (9), it generates an email with a hyperlink to the survey module (6) if the information came from the database or a hyperlink to the verification GUI (4) if the information came from the GUI (4) at step 303. This email is sent to the user (11) at step 304. Simultaneously, the module sends the User ID, Product or Service ID to the Survey Module. At step 305, the system checks it has been one week since purchase. If it was, then at step 306 the system checks to see if the user has responded to the first email. If the user has not responded to the email, the system checks if the email had been sent twice. If it had not been sent twice, then the system returns to step 303 and repeats. If the email was sent twice, then the email function ends.

Figure 11:
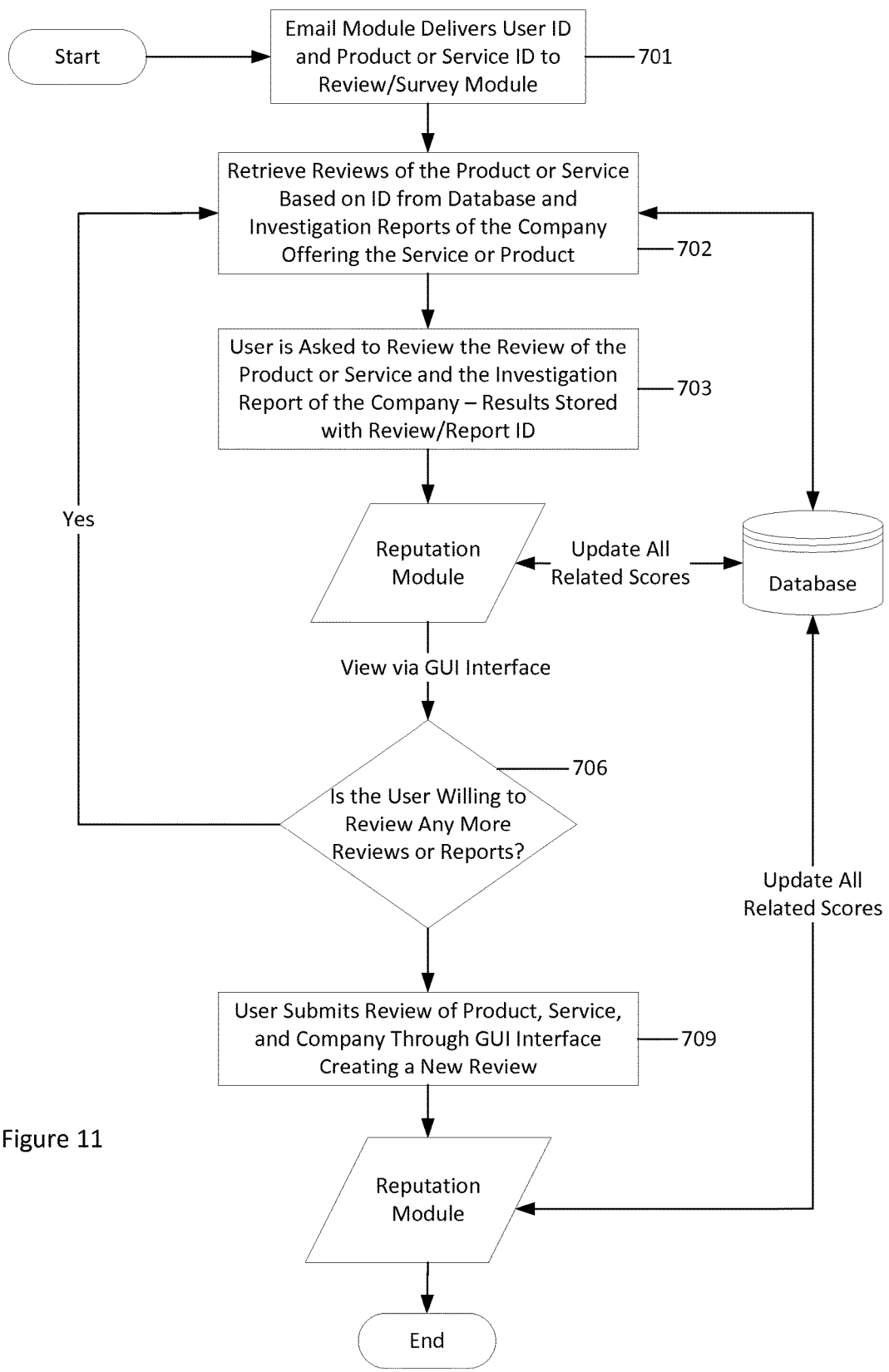
FIG. 11 is the Review/Survey module.

FIG. 11 is the Review or Survey Module which illustrates the operation of the survey module (6). As illustrated, at step 701, the user ID and the product or service ID are received from Email Module (9). At step 702, the system retrieves from the database module (5) reviews having the same product ID and the investigation reports of the company that creates/sells the products for products, or, if the id is a service id the system retrieves reviews of the services and the investigation reports of the company that offered the services. At step 703, the non-certified user (11) is requested to rate the review as to the accuracy compared to the product or service experience of the user (11). At step 704, the system accepts the entry of a number as to how accurate the review was in comparison to the product, service, or company. At step 705, the system sends the user ID of the writer of the review or investigation report and the rating of the accuracy of the review or investigation report to the Reputation System Module (7). At step 706, the Survey Module (6) checks if the user (11) is willing to review any more reviews or investigation reports; if they are, then the system repeats steps 703 through 706 until the user is unwilling to review any more product/service reviews or company investigation reports. At step 707, the system retrieves the product or service information from the database module (5). At step 708, the non-certified user (11) is asked to rate the product according to their experience. The comments made by the user (11) and the number for the quality of the item are accepted at step 709 to create a new review of the product, service, or company. At step 710, the user ID, product ID, comments, and quality number are stored in the database module (5) in the review table. Review comments and rating score may thus be provided by the reviewer on the score provided by a non-reviewer. The reviews will be displayed in the GUI Module (4) after the user (11) has selected an item for which they want to view the description. In a preferred variation, the review ID being stored along with the user ID in the relational database at the point of where the email module 9 sends the survey form such that the review which the user is most encouraged to rate is, first and most importantly, the one(s) which s/he had initially reviewed (or spent the most time reviewing).

Figure 12:
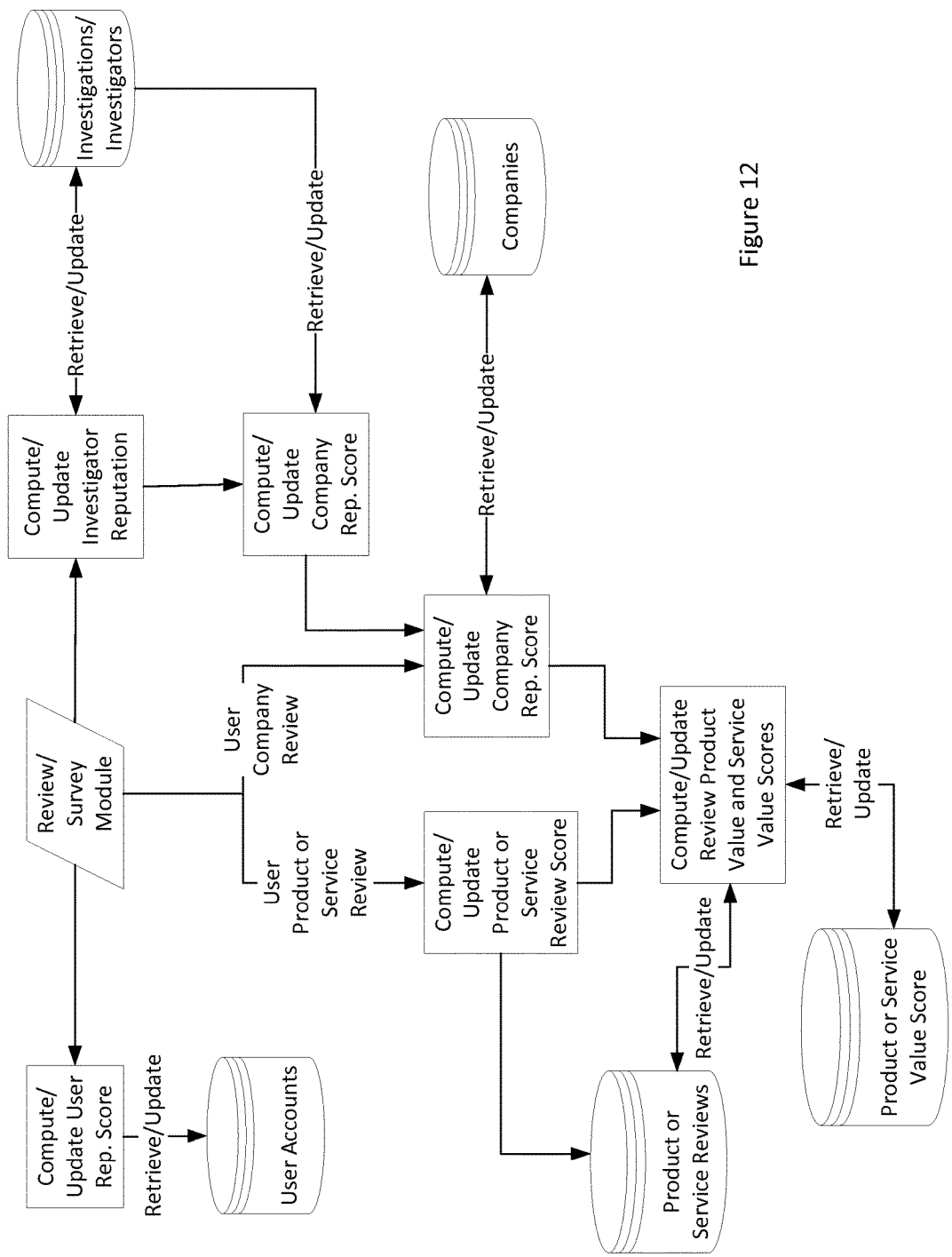
FIG. 12 illustrates the Reputation module.

FIG. 12 is the Reputation Module that illustrates how users and investigators reputation (or weighted score) are updated. The update of these reputations cause the company score to be updated. The user and investigator reputation update the product score, service score, and investigation report score, then these two values operate in conjunction with the company score to updates the Product Value Score, and Service Value Score. The Product Value score and Service Value Score are used to initially sort a search list initiated by the users through the Search Engine. As illustrated, at step 501, the Reputation System Module (7) receives the user ID and rating of accuracy from the Survey Module (6) with the product ID, service ID, or company ID. At step 502, the original weighted rating for the user (11) is retrieved from the Database Module (5) where it is stored in the user table. The new score is averaged together with the original weighted rating to create a new weighted rating at step 503. The new weighted rating and user ID are sent to the Database Module (5) to update the user table with the new weighted rating at step 504. The Reputation Module also updates the Investigator's Weighted Rating, or reputation, by averaging the original weighted rating with the new rating of their company investigation to create a new Investigator's Reputation. Then the Reputation Module uses the new user reputation to calculate new review scores of the company. The company score is updated using the average review score of the companies by users and the investigators report score average for the company, which can be displayed by type of factors such as social economic factors, political factors, and customer service factors. These factors are averaged together to create an overall company score. Finally, the product or service value scores are updated by using the average of all reviews of that product added to the overall company score.

Figure 13:
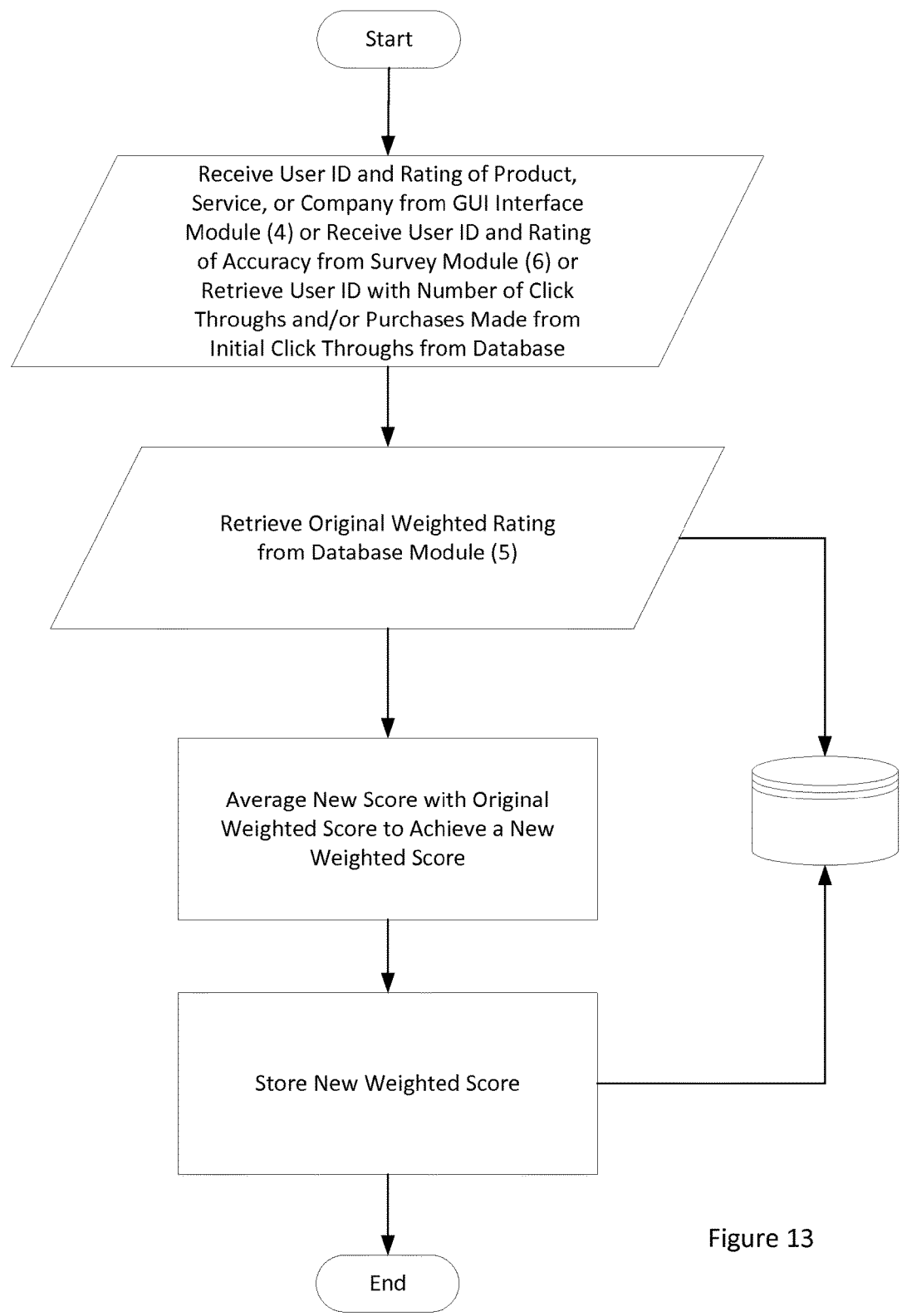
FIG. 13 illustrates the reputation system in greater detail.

FIG. 13 shows how the Reputation System updates the respective scores.

Figure 14:
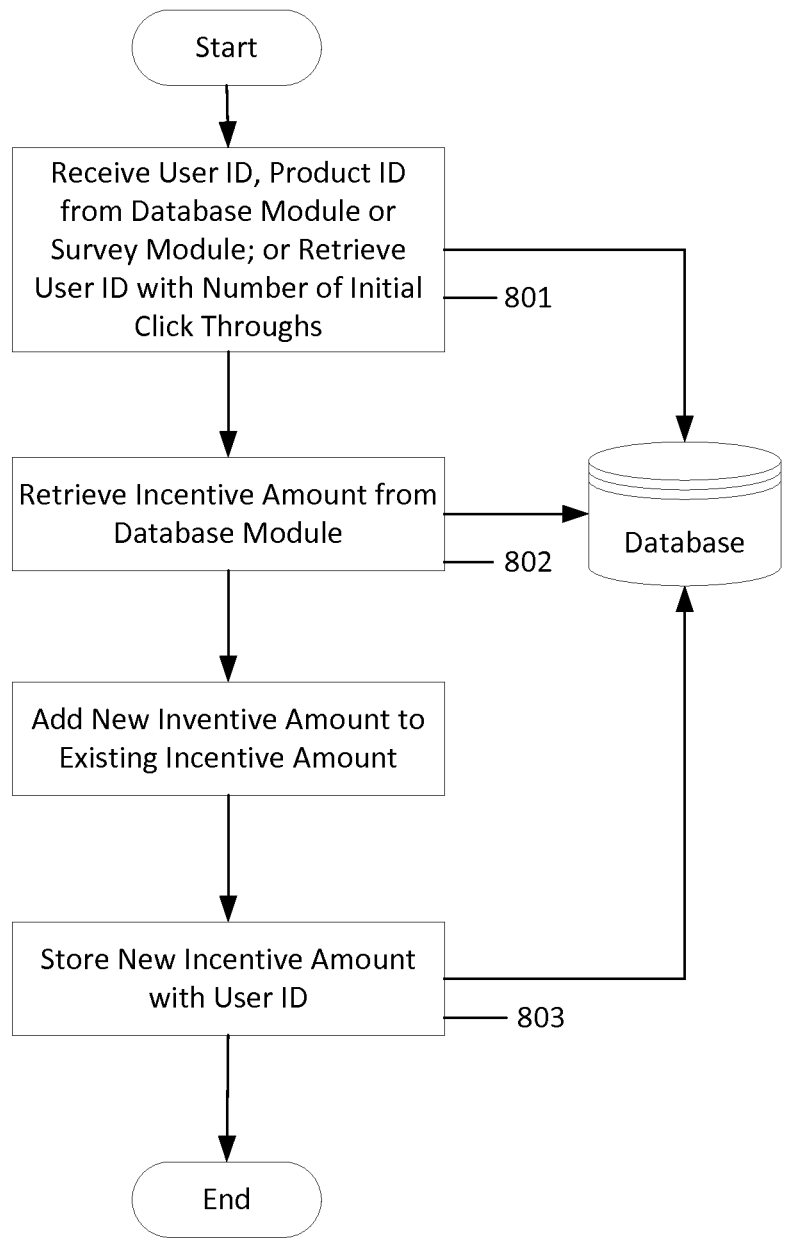
FIG. 14 illustrates how users are incentivized.

FIG. 14 illustrates the Incentivization of Users and Investigators. The system provides incentives to users (11) to provide product and service reviews, company investigations, and reviewer ratings. As illustrated, when a new or updated weighted review is received from either the Product selection on the salability of the review or from the survey module on the accuracy of the review to the database module (5), then a macro is automatically activated to send the user ID and product ID from the purchase table to the virtual money module to activate the incentivization feature. At step 801, the system receives a user ID and a product ID from the database module or survey module. The incentive amount for that item is retrieved from the company data in the database module (5) at step 802. The incentive amount is transferred/stored with user ID/Account at step 803. For example, one implementation of this scheme could involve users who are subscribed to Facebook (or Facebook vis-a-vie their Woddles account) receiving a virtual lottery ticket each time they refer a review to their friends wherein a virtual lottery ticket would be awarded them each time their universe of friends received a referral to the review as occurs in response to the user "liking" that review.

The economic incentive system used in the WiseOwl system incentivizes behavior of users (11) who are capable of significantly enhancing the accuracy and overall performance of the current system. For example, in the Woddles' consumer product review search implementation, incentives rely primarily upon a percentage (commission) of the actual sale of the product to which the review pertains and to which the writer is entitled (as the link on the search results, product review or product page leads to the corresponding product page and/or purchase form). In the present implementation, the incentivization to drive search certified users (11) to utilize (or obtain) their expert—knowledge" in the form of quality or value based recommendations is economically driven by the fact that the reviews containing the best recommendations will ultimately end up on the top of the search results ranking (as proven by peer user ratings). Put another way, the advice which ultimately ends up being the most valuable advice tends to end up the closest to the top of the result rankings because of the resulting purchase click throughs and thus ends up getting economically rewarded appropriate to its quality. Because certified users (11) are entitled to receive a percentage of revenues which are directly associated with results which they successfully recommended and thus were able to get placed in the search ranking, for example, in association with a given query, reviews will ultimately be (potentially handsomely) economically incentivized to make good quality, accurate product recommendations (or to become expert enough in certain product category/search domains to be able to provide them). For product categories/queries which are more popular than others, the incentive to provide such superior quality recommendations will be greater, but also so will be the level of competition. All in all, if this commission structure (compensation from corresponding user purchase click through) is sufficiently compelling, there should be adequate incentive structure to drive reviewers to provide superior and potentially unprecedented quality product recommendations across all reasonably worthwhile popular or interesting product domains. The certified users can also be compensated for advertising WiseOwl and WiseOwl products and services.

As noted above, a feature of the invention is that an explicit rating of the recommendations embedded in the reviews is determined by the purchasers of the products based on their experiences with the product. However, if the product is new, the explicit rating of the recommendations in the corresponding reviews may not be possible. In such a case, a prediction of a measure of the quality of the reviews and the embedded recommendations need to be computed. This predicted explicit rating of the review by existing purchasers is not available directly. A predicted estimate of the quality of the recommendations embedded in the reviews is determined by taking an average of the measure of quality of all the reviews in the same category written by a single user (11). In fact, the explicit ratings of reviews based on buyers' comments about the quality of the review or his/her perceived value of the product, is the preferred measure. If a product is new in the market and hence a sufficient number of reviews and embedded recommendations in the reviews are not available or such reviews have not been rated by other buyers, then the predicted quality of the product must be used in the search engine.

On the other hand, a reviewer's score may be given a percentage weighting based on the number of reviewers so that reviews for new products are not disproportionately weighted. Reviews and weightings also may be based on predicted or other values until a sufficient number of reviews are available. Also, the system may weigh reviews and/or eliminate anomalous reviews from reviewers and/or retain a weighted average for reviewers so that anomalous ratings do not adversely affect the accuracy and reliability of the weighting system. In the cases where there are only a few scores of the review available, the following relation may be employed: Review score=$w_1$*reviewer score+$w_2$*review score, where weighting $w_2<w_1$. However, for a normal case, when a sufficient number of scores are available for a review, $w_1<w_2$. Realizing that review score is a fraction of the score of the reviewer, in one embodiment, instead of a user providing a rating score to a product, it is assumed that the product s/he recommends and/or writes a review about is the top ranked product in that category. If the product were scored as a fraction and no rating score to the product is provided, it would be assumed that the review score is automatically a 1. In this variation, the underlying assumption may be the fact that because users (11) are driven primarily by hopes of economic compensation, they will tend to provide recommendations for products which due to their high quality (or value) will provide a review score (when adjusted for by their own reviewer score) such that their review will receive highest possible visibility in the search engine results.

Figure 15:
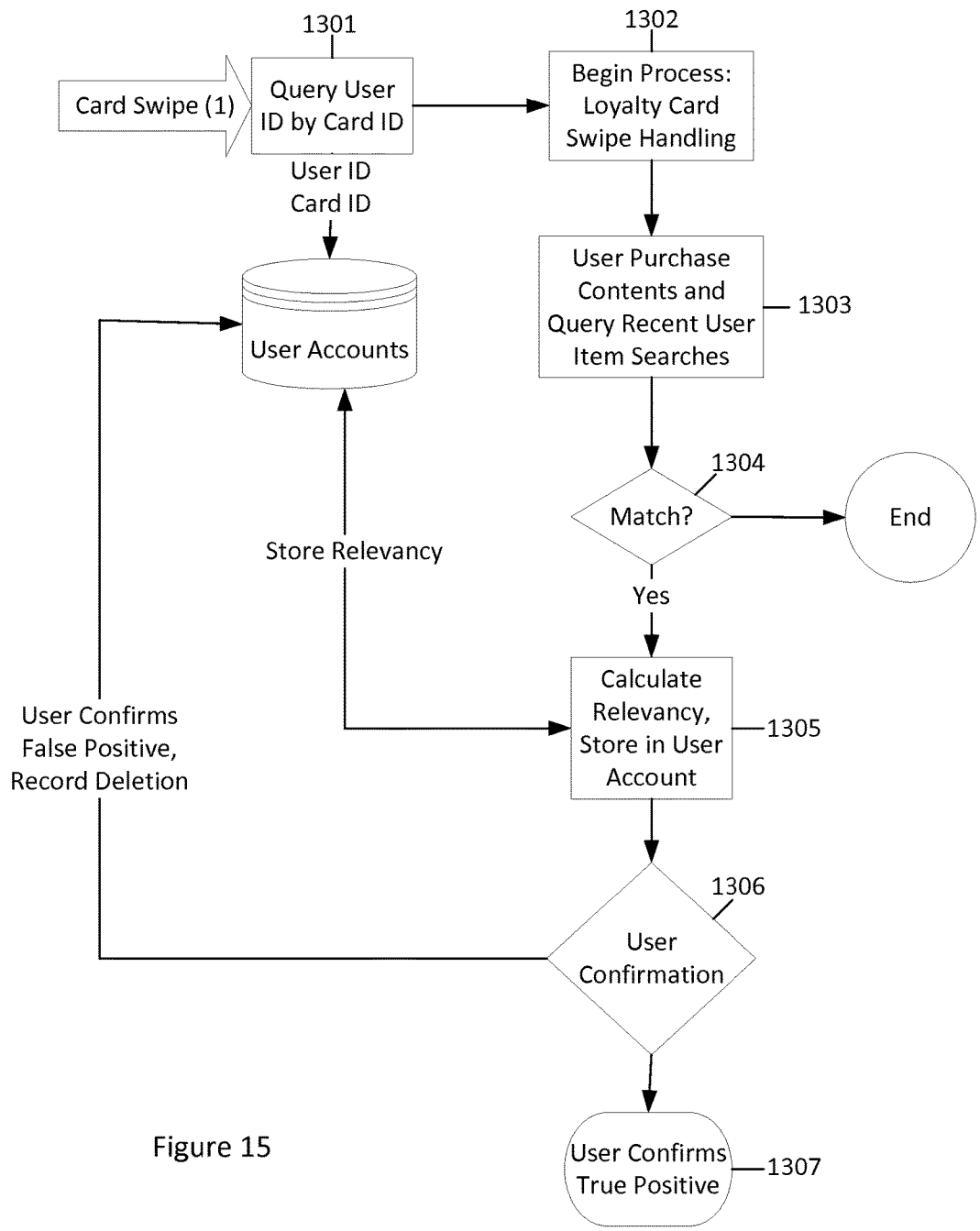
FIG. 15 illustrates how the loyalty card process operates.

FIG. 15 demonstrates one way that a user or investigator can be incentivized, namely through a lottery system. Each day the system retrieves the incentive amount for key events such as a certain number of initial click throughs or an investigator score above 90%, and then searches for all users, or investigators, that meet this guideline. The system then uses an off the shelf lottery number generator to give each user/investigator that meets the guidelines a virtual lottery ticket. This virtual lottery ticket number is stored with the user ID and a macro enters it into the off the shelf Lottery Selector. At the end of the month, the Lottery Selector will choose a number. The Lottery Macro will then retrieve the user ID, and email, associated with that lottery number. The Email Module will send an email to the user regarding their win.

From the above description, it will be appreciated that the vendor provides information about the consumer item to WiseOwl that in turn uses the information to sell the item to its users (11). WiseOwl uses the query search terms from the user (11) to find the products from its business partners that match the need of the user (11) as a consumer. WiseOwl also collects credit card information and other information from the user (11) to complete the transaction. WiseOwl assists the user (11) in selecting the best possible product by providing him/her the reviews of the products. The reviews themselves are rated by other users (11) in order to provide the best information to the consumers using the WiseOwl website. A user (11) enters the WiseOwl website with a user ID and password. This mechanism allows WiseOwl to track the users (11) such that the reviews that are provided to WiseOwl website are not tainted or biased by the retailer or manufacturer.

Offline consumer purchases constitute nearly 85% of total purchase volume in the field of retail. Having designed the current system in light of the ease and convenience of consumers to shop online in conjunction with the ready access to peer rated review based recommendations, it is recognized that the system of the invention may also be used to provide information useful in solving information dissemination problems within the fields of consumer information, social media based commerce, and e-commerce searching in general. A bar code read application for cell phones can be tailored to enter the WiseOwl website for a user (11) and enter the product ID for the product identified by the bar code reader, then proceeding through the search engine and ranking systems to display via GUI interface on the phone for the user (11). For example, the WiseOwl system can be tailored for identifying and correlating off line purchases as having been attributable to the fact that the buyer previously read a review of the consumer item at the WiseOwl website.

Such a confirmation would enable compensation back to the reviewer to accrue on his/her WiseOwl account. The confirmation of the influence by the review at the WiseOwl website has to be achieved by two facts: (1) the buyer who read a review for that product can be identified, due to the WiseOwl log in by the user (11); and (2) the buyer can be re-identified at the point of the offline purchase. This requires automatic notification to the user's account at the WiseOwl server by the use of his/her virtual loyalty card as shown in FIG. 15. The Loyalty Card section of the WiseOwl illustrated in FIG. 15 requires a relationship between the WiseOwl website and each participating vendor and its virtual loyalty card.

The WiseOwl system preferably allows users (11) to accrue two types of loyalty points: one for use with any vendor subscribed through WiseOwl and these points would only be credited to the user (11) if the user (11) accessed a corresponding review on the WiseOwl web site of the product in advance of making a purchase for the corresponding product. The second type of loyalty point would consist of virtual lottery tickets every time they have referred another non-certified user (11) that makes a purchase through their off-WiseOwl review of a product that contains a link to WiseOwl. The limiting of the loyalty credits to the users (11) who only access WiseOwl review and the fact that WiseOwl would like to enable points to be credited for the user (11) for any purchase which is made with any of the vendors which have subscribed to the WiseOwl program would, of course, require that this particular virtual loyalty card program be established between WiseOwl and the virtual loyalty card. For example, one implementation of this scheme could involve users who are subscribed to Facebook (or Facebook vis a vie their WiseOwl account) receiving a virtual lottery ticket each time they refer a review to their friends wherein a virtual lottery ticket would be awarded them each time their universe of friends received a referral to the review as occurs in response to the user "liking" that review.

The system will retrieve the user ID (11) with the incentive amount, number of lottery tickets assigned to the user (11). An off the shelf lottery number generator will generate a lottery number for each instance of virtual lottery tickets the user (11) has earned. This lottery number is stored with the user ID in the database. The system will retrieve the possible lottery numbers at the end of the month. An off the shelf lottery selector will choose one of the possibilities as a winning number. The user ID associated with that winning number is retrieved from the database, as well as the contact information for the user. The user (11) is then notified they have won that month's virtual lottery. In accordance with the implementation to Facebook, the average Facebook user as of the time of this writing has 120 friends. To be practically feasible, it is mandatory that legal/regulatory restrictions regarding gaming laws be strictly adhered to. Because risk and reward (two of the three criteria to legally qualify as gambling) are adherent to the present scheme, it is imperative that no consideration on behalf of the user (the remaining criteria for gaming) be provided by the user. As such, the consideration which is provided (to be wagered using the virtual lottery tickets, number generator and random drawing scheme) must be provided by the revenues which are generated from WiseOwl, i.e. a portion of the commissionable revenues on product sales (or in a WiseOwl variation, revenues from simply user impressions of reviews, or even such impressions from online advertisements in lieu of reviews). Because the commissionable revenue on reviews (or ad revenues) are miniscule relative to the target goal of a virtual lottery jackpot, in order for this non-user consideration to become substantial enough to accrue to a critical mass which is of the size and scale of a true lottery, there must be the assurance of one additional factor. The review (or the ad) who's ultimate revenue supplies the jackpot for which the virtual lottery ticket is ultimately drawn for must become viral. Secondly, it must be referred to enough users to where the commission on the collective number of ultimate sales (or ad revenue) associated with the product or object of interest is substantial enough to support a large lottery, this requires a combination of a minimum percentage or more of friend referrals (e.g. Facebook likes) and sufficient time (referral cycles between jackpots) constituting any given lottery jackpot. For example, if 120 is the average number of friends for a given Facebook user, and each jackpot is 30 days apart, assuming an average of 1 referral cycle per day and assuming a minimum of 2 (out of 120) friends refer (about 1.8 percentage rate), and assuming 1 percent of reviews read resulted in a purchase and 1 dollar of commissionable proceeds to the lottery, then the jackpot would be $2^30 \times 1\% \times \$1.00$. As suggested, the use of the revenue source ultimately being generated from commissionable sales revenues (such as through reviews) is for illustrative purposes. As an example, the source could be simply from on-line advertisements in which case users would see the ad and by reposting it on their Facebook page would receive a virtual lottery ticket to their account potentially making the ad become viral. Because in the preferred embodiment the WiseOwl user account scheme in is assumed to be multi-site in nature in its ultimate incarnation the ad could in theory be picked-up on other sites. Moreover, if it were picked-up within the Facebook site platform, a "WiseOwl" ad could be served-up visa vie the Facebook ad server in which case from the user's perspective it would appear as an ordinary ad except for the fact that it would by virtue of its trademark (or associated explanation) it would represent (upon "liking" i.e. reposting to the user's friends) a virtual lottery ticket or chance to win the jackpot as generated from at least a share of the collective ad revenues. With such reposted ads, the ad targeting functionality in response to the user profile (which is an important advertising function of the Facebook service's ad server) could in one preferred embodiment also be served-up differently upon the reposting to the friend of the user in response to his/her user profile (in like fashion and as would actually be the case for every other ad delivered via the Facebook ad server).

WiseOwl would first offer the user (11) when initially setting up an account with WiseOwl or any subsequent time while logging on to offer subscriptions to the WiseOwl virtual loyalty cards in which the user (11) would select whichever participating card(s) she/he currently is a customer of and/or would like to use for future purchases of WiseOwl vendors be they on line or off line purchases. WiseOwl may record the length of time a user (11) spends reviewing the review, particularly if more than one review for the products are read and if the user (11) makes a purchase of the product from a brick and mortar store within a matter of hours or a few days of reading the reviews of the product.

The user (11) typically would identify and complete a purchase of a corresponding product following the reading of a review. The buyer would likely do it within a "reasonable" time interval using a credit card with one of the virtual loyalty cards to which the user (11) initially subscribed. The virtual loyalty and user ID are sent along with the (just purchased) product ID and associated vendor ID from the virtual loyalty card account to the WiseOwl user account database.

The WiseOwl database enables attributes to be related in conjunction with event specific actions (e.g. purchases and review page access) on the part of the user (11). If the data record associated with the user ID reveals that a review related to the particular recently purchased product was accessed by that user (11) within a given time window of the user (11) having purchased that product in accordance with notification from the virtual loyalty card data base, then a rule is triggered indicating that the user (11) is entitled to a credit of an appropriate number of loyalty points for having made that purchase. Such rule can be provided as an offer in conjunction with the review itself. In this scenario, it will typically be reasonable strategically to provide the customer a credit on his or her loyalty program account for having read the review and following up with a purchase in as much as if the same is stated as a secondary notification on the review itself. It would incentivize the reader to subscribe to the loyalty program prior to making the purchase. It is reasonable in an alternative implementation to provide a link associated with the review which allows the customer to subscribe to WiseOwl while concomitantly enabling the user to become registered to the particular loyalty program associated with the online review as presented. (In the online product scenario the link to the purchase page may also provide online registration for WiseOwl and/or a customer loyalty program associated with the reviewed product which is associated with WiseOwl and in a database of associated selected vendors which provide that product and which are in physical proximity to the customer. These above registration options would of course only appear if prior registration was not performed by the customer.

The Search Engine Module is depicted in 2 illustrations, one for the Woddles Module and one for the WeAreYour Module as the search results are automatically transferred to one of these modules. Two steps happen simultaneously in these figures depending on whether the search term was for a product, company, or service. If the search term was for a product, then FIG. 13—Search Engine illustrates the process as the related search terms are transferred to the Woddles Module and sorted into a specific type of list for the user (11). Both ranking systems take into account specific user information to display the results via the GUI interface. If the search term was for a company or service, then FIG. 13—Search Engine illustrates the process as the related search items are transferred to the WeAreYours Module and sorted into a specific type of list for the user (11). Both of the illustrations are described in greater detail during their respective module discussion.

Figure 16:
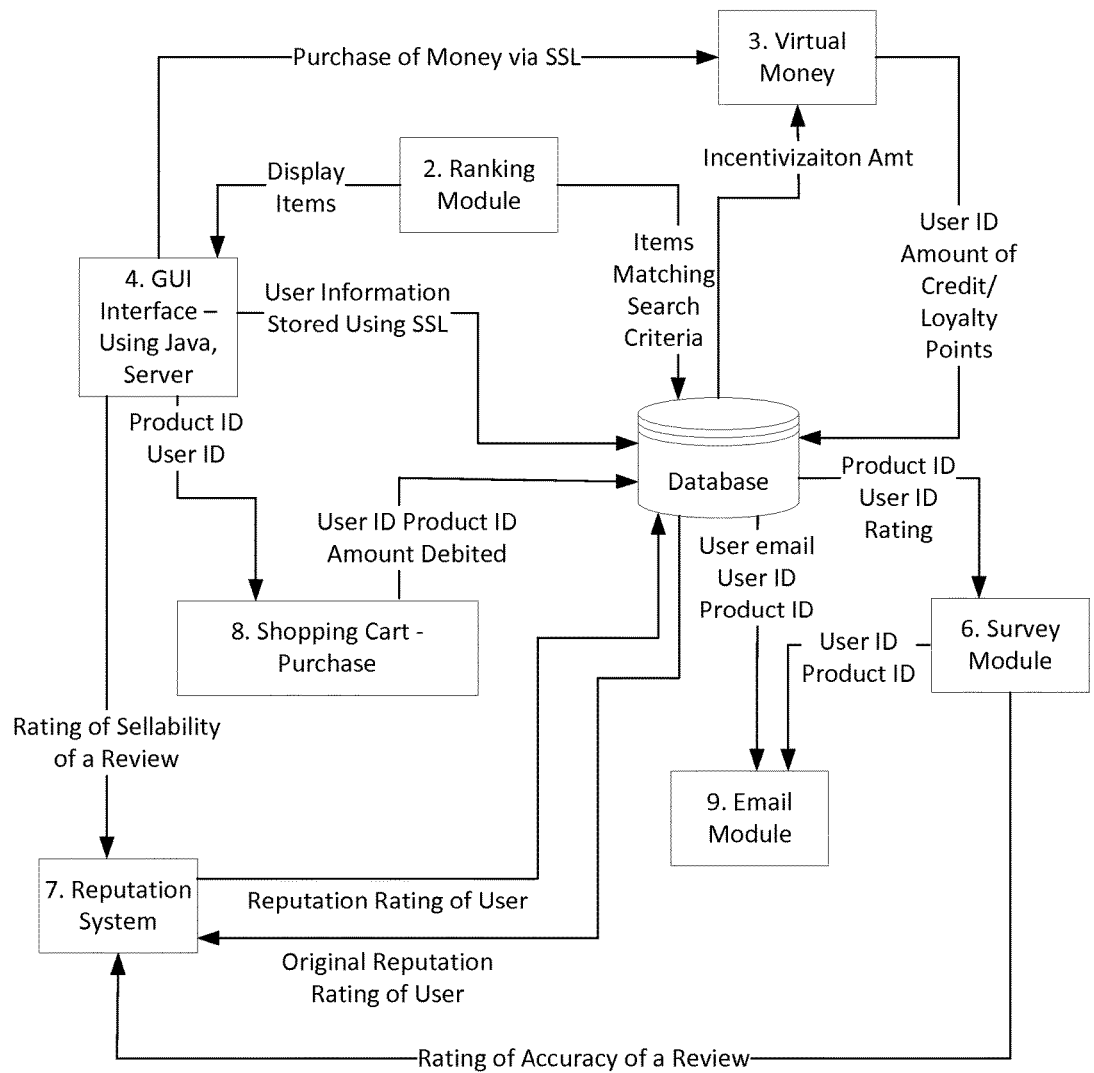
FIG. 16 illustrates how the modules inside of the Woddles module interact with the WiseOwl system.

The Woddles Module contains several sub-modules unique to its system. The three systems unique to the Woddles Module are the Virtual Money Module, the Shopping Cart Module, and the Ranking Module. FIG. 16 illustrates the flow of information through the Woddles Module, including how the WiseOwl modules interact with the individual sections of the Woddles Module.

The Woddles Search Engine (1) provides its users (11) the ratings of the consumer products based on the query parameters such as quality or value of the product from its internal database (5) of reviews of the consumer products. The Search Engine (1) assists its users (11) to buy the products from the market based on their desired features about the product. In fact, in one variation of the invention, in an alternative scenario whereby a (newly proposed) feature ID is maintained on the database, features of products of a particular type/category may be rated according to user ratings at the product feature level. In accordance with additional search and click through, purchase data and/or direct feature survey ratings such feature level ratings may become an additional input variable to the ranking formula processed by the ranking module.

Figure 17:
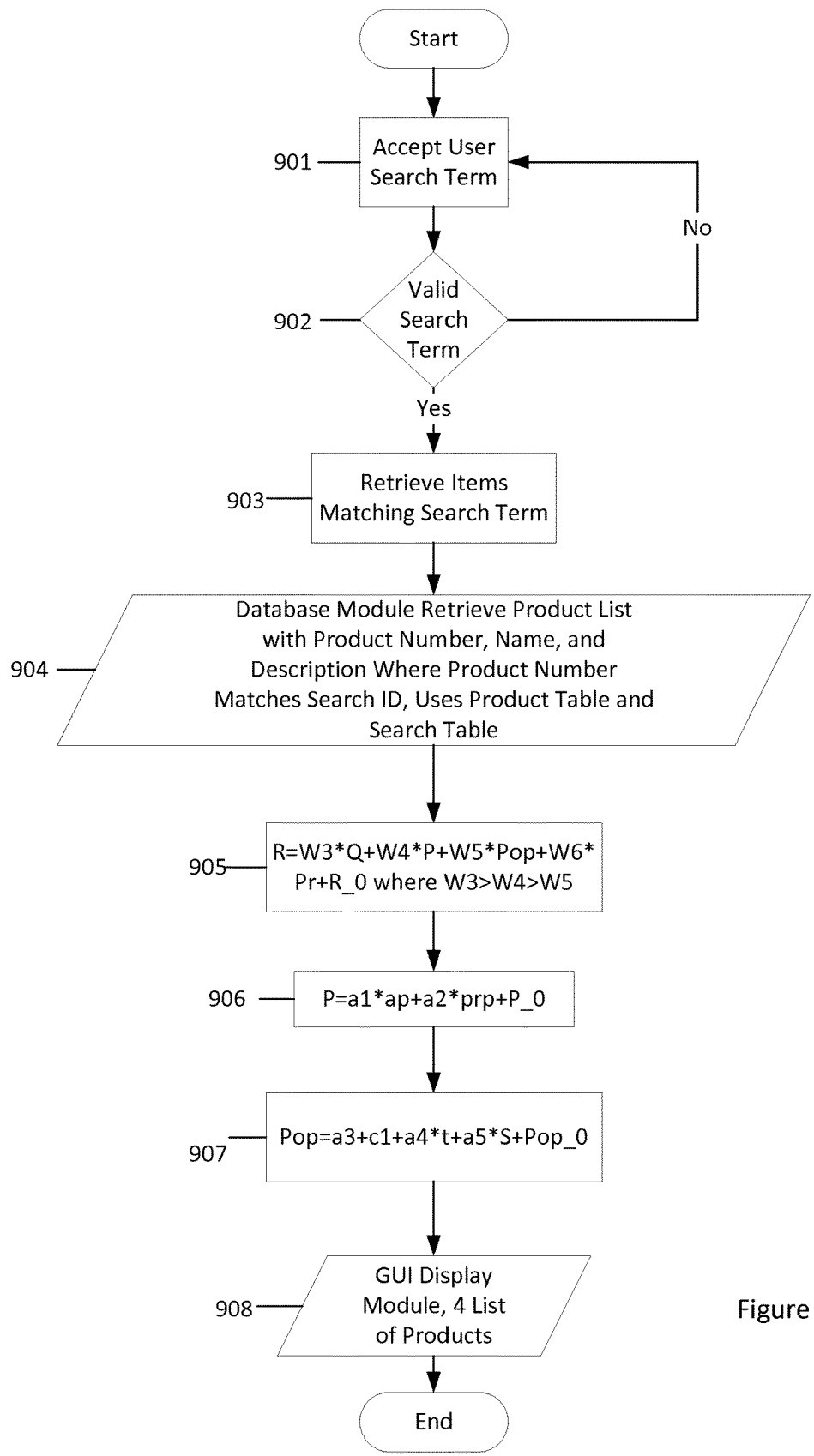
FIG. 17 illustrates a sample embodiment of the Woddles Search Engine.

The Woddles Search Engine, in FIG. 17, illustrates a sample embodiment of the Woddles Search Engine (1). As illustrated, the user (11) as a prospective buyer puts in a query at step 901 about the product and the search engine's machine learning capabilities enable statistical correlations to be established between query terms and search results as discrete items. The search term is checked for validity at step 902. At step 903, the Search Engine (1) pulls all items matching that query from the database module (5) by first looking at the search description table and finding what number that search description is, then going to the search table and finding all products that have that search number. The results of this query are sent to the Ranking Engine (2) at step 904. The Search Engine (1) also provides the statistical correlations of the term attributes in the search results of the reviews of the products written by a selected group of Woddles users (11) named as reviewers. The Search Engine (1) also utilizes quality rating value as the primary and initial weighting scheme for all results.

Normally, a high click-through rate of a specific web content leads to a traditional search engine receiving higher search terms from the content causing a higher weight for the content in the future query/results correlations. Based upon the relative term frequency, some terms are automatically deemed more relevant than others leading to driven up query/result correlations. This along with higher click throughs of certain lengths over others leading to higher relative popular weighting is part of a normal popularity ranking systems based search engine. However, the Search Engine (1) of the invention replaces the normal popularity rankings of the results to the user's query with the general quality ranking of the results from the reviews within the Woddles database (5). All of these calculations will result in a number which can be used as a box score on the display for the user (11). Test results on real data to see which is the first fall back and which is the secondary fall back. In other words, regarding the ranking formula, the relative values of weighting w for each of these variables will be determined by real test data.

The overall aim of Woddles is to sell its vendors/clients' products through Woddles' own website to its users (11). In order to show the effectiveness of Woddles marketing technology, we start with an introduction of a term, Effective Ranking, R, of a given product from a vendor. The effective ranking, R, of a product is defined as:

$$R = w3*Q + w4*P + w5*Pop + w6*Pr + R\_o,$$

where Q=Quality of the product, P=purchase propensity of the product, Pop is the popularity of the product, and Pr is the Preference for the product. In this relation, w3>w4>w5. This formula is shown in Step 905 of FIG. 17. Purchase propensity, P, =a1*ap+a2*prp+P_o, where ap is actual purchase and prp is predictive purchase. This formula is shown in Step 906 of FIG. 17. Predictive purchase is obtained by the modeling of text attribute profiles of the product reviews. Popularity, Pop, in turn, is measured by three different parameters such that:

$$Pop = a3*Cl + a4*t + a5*S + Pop\_o$$

where Cl=number of click throughs for the product, t is the time spent by the users (11) reading the information about the product, and S is the number of items already sold. This formula is shown in Step 907 of FIG. 17. The effective ranking of a product at step 905 will be an input to Woddles search engine in order to bring the high quality products at best value to Woddles users (11). The results of the ranking analysis are provided on the display by the GUI module (4) as a list of ranked products at step 908. However, for users (11) searching for reviews and not the products, the effective review ranking RR would be defined as:

$$RR=m1*\text{the product effective ranking }(R)+m2*\text{Review Score,}$$

where Review Ranking=f(quality)+g(Review Score) and Quality=h(Purchase Propensity).

As illustrated in FIG. 15, the selling company's (vendor's) (10) data flow provides the vendor's information and the vendor's product information to the online system's database (5). As illustrated, the system also may provide a payment of virtual money to the vendor when users purchase items through the online system's shopping cart (8) and virtual money system (3).

When a user (11) returns, he/she can rate the product and the review for accuracy. The database (5) captures this product review/rating review with the user ID/item ID. Each time a review is rated, the user (11) who first produced the review is awarded a monetary amount for their review through the virtual money component (3). The online system may also accept transactions for virtual money or real money that can be used to purchase items at the online system's website.

Figure 18:
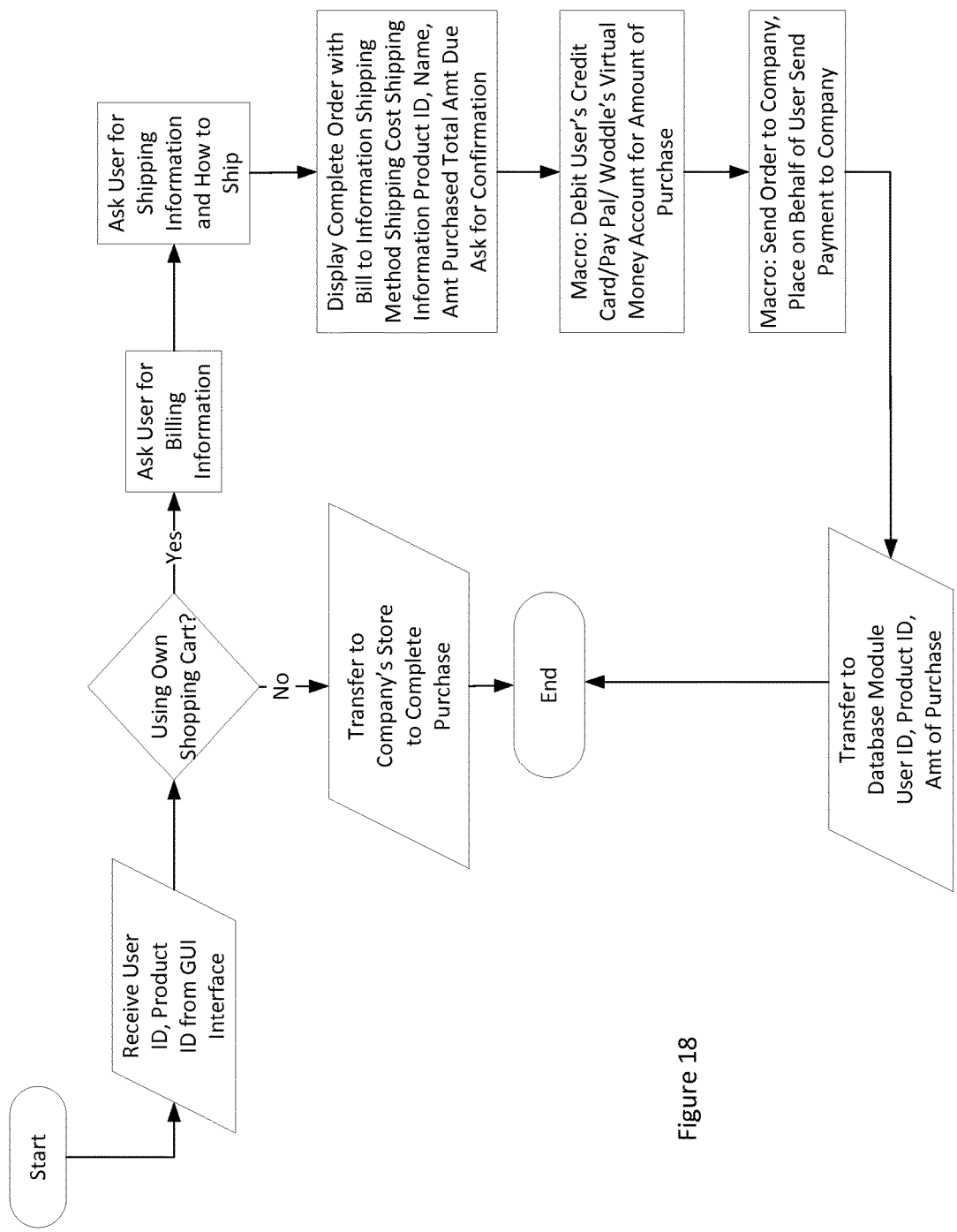
FIG. 18 illustrates how the shopping card works.

FIG. 18 illustrates the operation of the shopping cart module (8), using Secure Socket Layer encryption. As illustrated, at step 601, the shopping cart module (8) receives from the GUI Module (4) the user ID and product ID of the product that the customer wishes to purchase. This is done by the user (11) clicking on the product they wish to purchase and saying add to shopping cart. The user ID and search ID, as appropriate, are stored in the database module (5). At step 602, the system checks if it is to use its own shopping cart or to send the user (11) to an outside website to complete the purchase at step 603. At step 603, the transfer would include Product ID, quantity, and user ID. If the shopping cart module is internal, at step 604 the system requests the user's billing information. At step 605, the system requests the user (11) to input shipping information and to select a shipping method. At step 606, the shopping cart module (8) displays the complete order with: bill to information, shipping method, shipping cost, shipping information, product ID, name, amount purchased, and Total Amount Due and asks for confirmation. At step 607, a macro is activated to debit the user's credit card/Pay Pal/Woddles Virtual money account for the amount of the purchase. At step 608, another macro will go to the company's web site and place an order on behalf of the user (11) and then will send payment to the company for the order. At step 609, the system transfers to the database module and into the purchase table the user ID, product ID, and amount of purchase. This information will be used in the Ranking Module (2) whenever it is determining the rating of a product.

Figure 19:
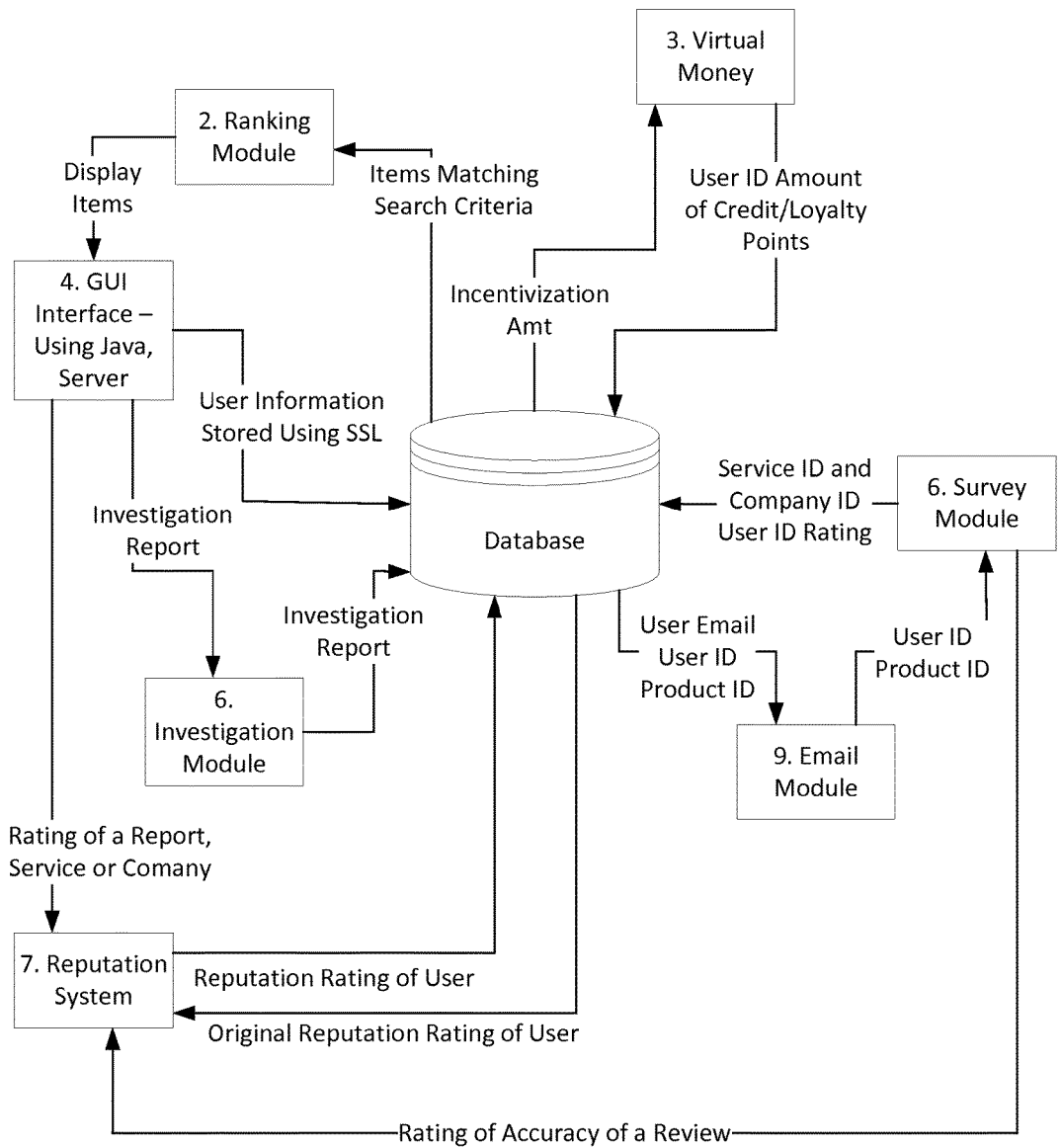
FIG. 19 illustrates how the modules inside of the WeAreYours module interact with the WiseOwl system.

The figures covered under set 20 are related specifically to the WeAreYour Module. FIG. 19, shows the overall flow of information in the WeAreYour Module, including how the WiseOwl modules interact with the individual sections of the WeAreYour Module. There are 2 unique elements in the WeAreYour Module—the Investigation Module and the Ranking Module. While the Ranking Module uses the same formula as the Woddles Module's Ranking Module it is different in the aspect of how services are rated.

Figure 20:
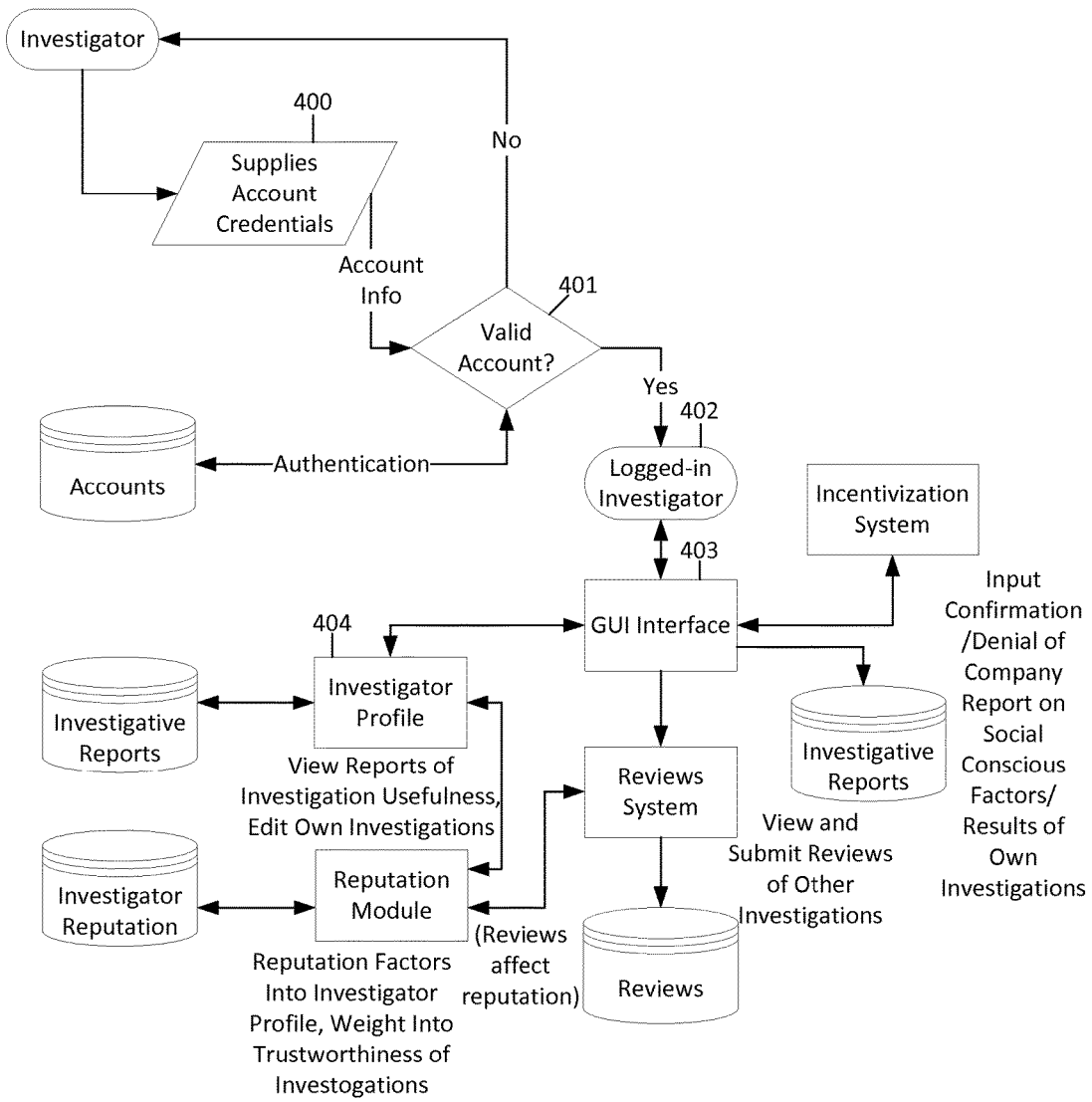
FIG. 20 illustrates the Investigation Module.

FIG. 20 illustrates the Investigation Module. At step 400, the investigator provides their ID and password which is validated in step 401. If it is invalid the system reverts to step 400, otherwise the system progresses to step 402 and logs in the investor. The investor then progresses to the main GUI in step 403. The investor may view their profile, where they can view reports of investigation usefulness or edit their own investigations in step 404. This will take input from the Reputation module. They may also view and submit reviews of other investigations by accessing the Reviews module.

As illustrated in FIG. 17, the user (11) as a prospective buyer puts in a query at step 901 about the service or company and the search engine's machine learning capabilities enable statistical correlations to be established between query terms and search results as discrete items. The Search Engine (1) pulls all items matching that query from the database module (5) by first looking at the search description table and finding what number that search description is, then going to the search table and finding all products that have that search number. The results of this query are sent to the Ranking Engine (2) at step 904. The Search Engine (1) also provides the statistical correlations of the term attributes in the search results of the reviews of the products written by a selected group of WeAreYour users (11) named as reviewers. The Search Engine (1) also utilizes quality rating value as the primary and initial weighting scheme for all results.

Normally, a high click-through rate of a specific web content leads to a traditional search engine receiving higher search terms from the content causing a higher weight for the content in the future query/results correlations. Based upon the relative term frequency, some terms are automatically deemed more relevant than others leading to driven up query/result correlations. This along with higher click throughs of certain lengths over others leading to higher relative popular weighting is part of a normal popularity ranking systems based search engine. However, the Search Engine (1) of the invention replaces the normal popularity rankings of the results to the user's query with the general quality ranking of the results from the reviews within the WiseOwl database (5). All of these calculations will result in a number which can be used as a box score on the display for the user (11). Test results on real data to see which is the first fall back and which is the secondary fall back. In other words, regarding the ranking formula, the relative values of weighting w for each of these variables will be determined by real test data.

The overall aim of WiseOwl is to sell its vendors/clients' services by referring the users to their respective agents/website. In order to show the effectiveness of WiseOwl marketing technology, we start with an introduction of a term, Effective Ranking, R, of a given product from a vendor. The effective ranking, R, of a product is defined as:

$$R=w3*Q+w4*P+w5*\text{Pop}+w6*Pr+R\_o,$$

where Q=Quality of the product, P=purchase propensity of the product, Pop is the popularity of the product, and Pr is the Preference for the product, which takes into consideration the customer service rating of a company. In this relation, w3>w4>w5. This formula is shown in Step 905 of FIG. 17. Purchase propensity, P, =a1*ap+a2*prp+P_o, where ap is actual purchase and prp is predictive purchase. This formula is shown in Step 906 of FIG. 17. Predictive purchase is obtained by the modeling of text attribute profiles of the productive product reviews. Popularity, Pop, in turn, is measured by three different parameters such that:

$$Pop = a3*Cl + a4*t + a5*S + Pop\_o,$$

where Cl=number of click throughs for the product, t is the time spent by the users (11) reading the information about the product, and S is the number of items already sold. This formula is shown in Step 907 of FIG. 17. The effective ranking of a product at step 905 will be an input to Woddles search engine in order to bring the high quality products at best value to WeAreYour users (11). The results of the ranking analysis are provided on the display by the GUI module (4) as a list of ranked products at step 908. However, for users (11) searching for reviews and not the products, the effective review ranking RR would be defined as:

$$RR = m1*\text{the product effective ranking } (R) + m2*\text{Review Score,}$$

where Review Ranking=f(quality)+g(Review Score) and Quality=h(Purchase Propensity).

Figure 21:
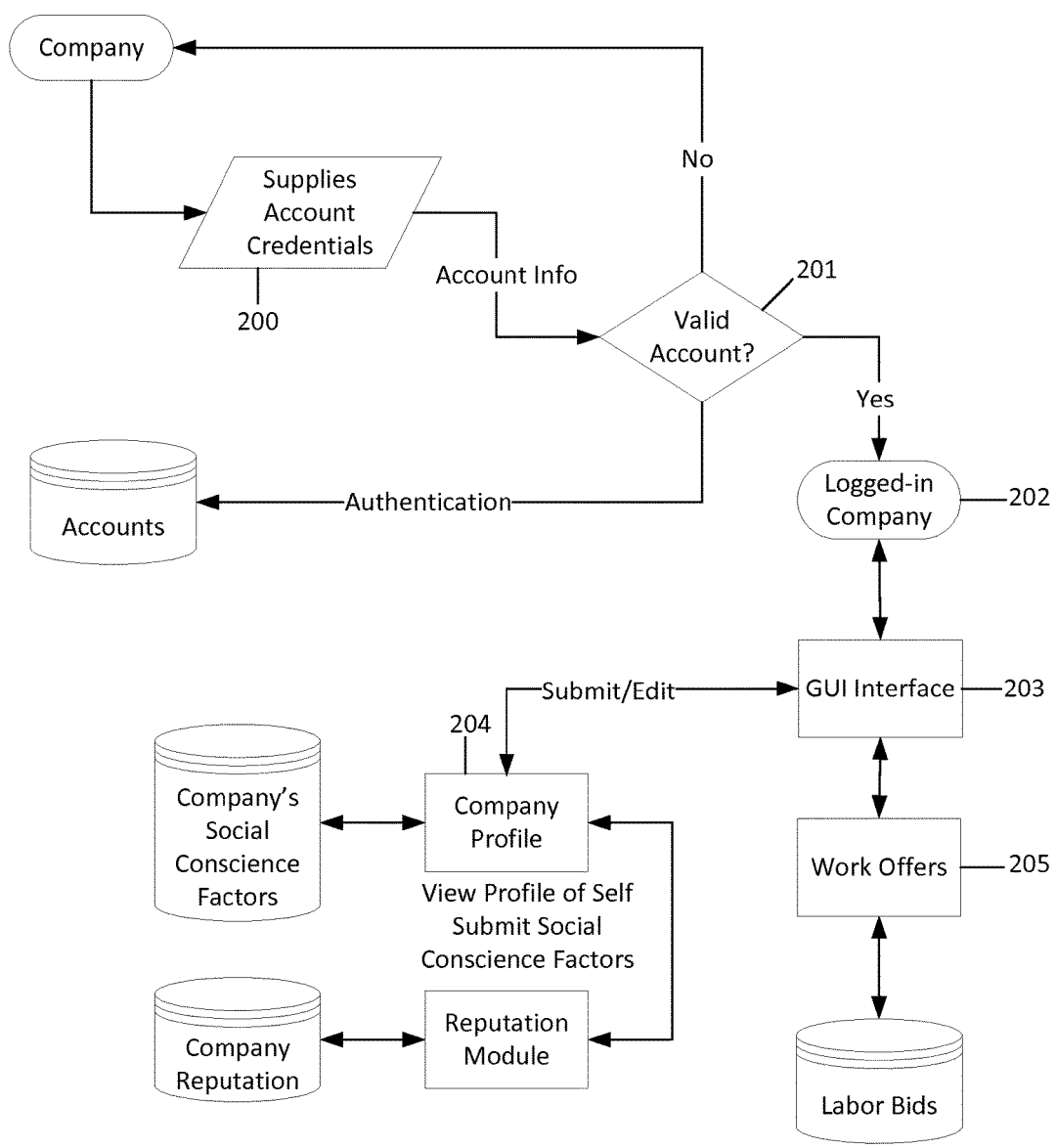
FIG. 21 illustrates how companies interact with the Online System.

FIG. 21 illustrates the system flow for a company providing the initial log-on information to gain access to the system. As shown, the system accepts the companies ID and password at step 200, and checks it against stored records to ensure authenticity at step 201. If the ID and password are not valid, the system returns to step 200, otherwise, the system proceeds to step 202 and the company is given access to a GUI (203). From here, the company may check its work offers in step 205, or view its own profile or submit its social conscience factors in step 204.

As herein noted consumer peer ratings determine quality of review recommendations and if explicit ratings are insufficient the quality of the review is commensurately adjudged instead according to the quality of the recommender himself plus any quality ratings s/he had ascribed to the quality of the product. This value (of the recommender) is a function of the averaged peer ratings of review recommendations for that reviewer within the same category (adjusted for by their own reviewer ratings).

The WiseOwl system thus assures that the buyer is first guaranteed that the reviews are accurate according to quality and/or value as adjudged by the reviewer's peer consumers and only then (secondarily) reviews are selected or prioritized which tend most to drive sales (for the benefit of the seller). As such, the WiseOwl system represents a paradigm shift (actually a reversal) of the traditional advertising model which is driven first and foremost by the seller's own interest in using promotion and salesmanship and paid exposure (including search terms) for purposes of driving sales and providing beneficial product information for the benefit of the buyer (secondarily). The use of personal testimonies in such prior art systems gives the impression of an impartial peer review but are driven by impartial motivation on the part of the consumer. The methods used in the WiseOwl system may be used for a variety of purposes, such as a hierarchical navigation menu to browse by category or subcategory or to be the basis for an online search engine wherein traditional search uses relevancy of the target selections to the query (including category term) in combination with overall popularity. Instead, in the proposed system, the traditional search variable of—popularity" for all practical purposes can be replaced by (explicitly or implicitly determined) quality and/or value of the product recommendation to the customer. As is often the case in the search for product or services, instead of product or service being searched (explicitly or discretely such as a pre-selected brand name) the user enters a search term which represents a category, subcategory, genre or other classifying descriptive term under which products or services might fall. Or the same in conjunction with narrowing search terms such as geographic location, descriptive characteristics of the product or service including price, product or service subcategories or characteristics unique to that subgroup of products of services. It is conceivable that the user may wish to search by quality and/or value. Alternatively, a search feature may be added by Which she or he may select by the added dimensions and popularity search (or even popularity exclusively) which brings the search methodology full circle back to the traditional search.

The WiseOwl system utilizes a web interface driven by a search engine and allows for extremely intuitive, natural interface. Perhaps most importantly, because the primary search criteria is user centric, not popularity, much less advertiser centric, the user (11) is able to entrust full confidence in the fact that the recommendations will always be prioritized explicitly or implicitly according to relevancy criteria of other peer consumers' estimations of authentic quality or value and purported quality of value as claimed by advertisers or even reviewers who have been paid to make biased reviews and opinions through advertisement review blogs on social media sites and where relevancy of results by the search engine have for these biased opinions (or more commonly search results and ads have been given prime positioning in either relevancy in either search result relevancy, search page ad space or social medial sites). The WiseOwl search system thus intends as perhaps its most fundamental business objective to provide an unbiased, trustworthy source of consumer information that can be accessed by basically traditionally accepted navigational techniques (e.g., search or menu navigation) and where the opinion to promote the products as well as the criteria for prioritizing the opinions is peer consumer based. The detailed embodiment of the WiseOwl system described above is designed and engineered with the objective of optimizing these functional objectives and thereby establishing a de facto gold standard approach for consumers to readily be able to find the highest quality products or services of any given type or category and to be able to trust with confidence the sources of that information as being not only unbiased but also from the most knowledgeable and qualified sources available for the particular opinion and recommendation rendered. As an additional measure to assure the quality of the opinions users (11) render through their reviews (the "reviewers"), an economic model to reward is provided to incentivize the review writers of extremely good peer rated recommendations to assure that users (11) who have valuable knowledge regarding certain product or service categories will actively share their knowledge or users (11) who have potential resources to acquire such knowledge (e.g., interest or inclination toward consumer products or consumer representative trends and interests) and the time and interest in supplementing their income to develop and acquire such knowledge, share it with other consumers, and be commensurately rewarded for doing so.

Reviewers who achieve the highest overall ratings for objective number and/or their reviews have received the highest ratings are rewarded by their review(s) receiving a high prioritization in search ranking for reviews. Because links to the product which is recommended are embedded in the review, this equates to high online sales volume vis-a-vie embedded links which are, in turn, commissionable to that reviewer. Secondly, once the high category ranking of the reviewer has been established she/he will preferentially be offered additional opportunities for the secondary primary review function which is to rate (via reviews) high profile products/services as explained above. As a tertiary review function, the reviewer may be preferentially offered the opportunity to rate (along with reviews if possible) all other products and services.

Because the WiseOwl system is designed to provide economic compensation to reviewers making good recommendations, a potential challenge for the system is finding the optimal incentive that will entice reviewers to turn out the best reviews possible without compensating them significantly more than is necessary to achieve that objective. This is an important factor given that reviewer compensation is derived from each sale of a product associated with that reviewer's recommendation (this is a direct cost to the seller). In certain categories where profile margins are very thin (e.g., books, music, video games) seller may only be willing to provide minimal compensation to reviewers. This is not to say that margin of profit to the reviewer could not be made up through sales volume but it also suggests that in such categories there will be more subjectivity in recommending one product over another due to differing tastes and preferences of the individual. This is when the use of collaborative filtering may be useful in determining "quality" and thus relevancy of the recommendations in as much as such quality determination is relative to the individual buyer. Still, this factor, in and of itself, would seem to indicate that smaller compensation to reviewers will be available having been spread among multiple reviewers.

Another issue to consider involves the case of more than one review recommending a given product and how to rank such "competitive reviews." In this case, the proprietary ranking formula for WiseOwl which focuses heavily on quality and secondly on sales propensity of the review would be utilized. On the other hand, if the review rating is the same/similar for the different reviews (as might be the case for identical explicit ratings), other factors according to the proprietary formula may then logically become stronger relative influencing factors in determining rank position, for example, purchase propensity or predictive quality of the review. It would be fair to give priority based upon timing of the review (the reviews which were just written would get a higher relevancy ranking) Other criteria could include the quality of the review itself as was discussed above with regards to relevancy among a given quality of reviews to be re-prioritized according to sales potential. Again, as above mentioned, click through and time spent reading the review factor into this estimation particularly where explicit sales data is sparse or lacking.

At the more general level regarding review ratings calculation (as also exemplified in the above formulas), if explicit review ratings by existing purchasers are insufficient to establish the quality estimate of the review recommendation (e.g., statistical confidence falling below an acceptability threshold), a predicted estimate of the recommendations quality is determined automatically by the averaged quality value of other review recommendations made by that reviewer within the same category. Therefore, explicit buyer ratings of reviews based on the buyers' perceived quality or value of that product is the preferred measure of the relevancy of the review in the search system. In addition, if such explicit buyer rating data is not statistically sufficient (e.g. the product is new such that review recommendations have not yet been sufficiently rated by the buyers to establish its quality ranking in search results), then as a result of the formula calculating the products effective ranking (R) the product quality search ranking criteria will naturally revert with a higher relative rating to average quality rating of other similarly categorized products by that same reviewer. If such data is insufficient (a final default), the reviewers ratings in all other categories.

In the ranking formula, in addition to quality rating of the product purchase propensity, likelihood of purchase activity associated with the product is another important criteria. Actual purchase statistics are the best predictor of this quantity. A secondary quantity is a value of predictive purchase estimation. Specifically, if the preferred measure of sales potential is insufficient to make a determination (e.g., review and/or the product is extremely new), the default criteria are the textual attributes of the review which are predictive of driving sales. This prediction is made using, for example, a text analysis module. An additional input variable to this prediction is the degree of sales activity for other reviews by that same reviewer emphasizing the sales activity for reviews of products within the same category if such information is available. A further input criteria to predicting sales activity is click through rate which may be based upon click through of the product which may include click through of the product from the review as well as time spent reading the review.

In an example embodiment of the invention, the online system is implemented on a processor of a server and is in operative communication with a memory component. The processor may include a standardized processor, a specialized processor, a microprocessor, or the like. The processor may execute instructions including, for example, instructions for implementing the various modules described above. The memory component stores the instructions that may be executed by the processor to implement the modules described herein. The memory component may include a tangible computer readable storage medium in the form of volatile and/or nonvolatile memory such as random access memory (RAM), read only memory (ROM, cache, flash memory, a hard disk, or any other suitable storage component. In one embodiment, the memory component may be a separate component, while in another embodiment, the memory component may be integrated into the processor.

Fraud Prevention and Detection Considerations

Because engendering consumer trust in the unbiased truthful nature of the system is such a foundational premise of the invention, it is important to anticipate and guard against ways in which the invention can be exploited and hijacked. The untainted and unvarnished nature of the site's reputation as a gold standard for trustworthy consumer information would accordingly tend to make it a target by which exploiters might intentionally hijack that trustworthy reputation which had been justifiably earned (and thus should be rightfully preserved). For example, users could be agents of an unscrupulous vendor such as where such vendor incentivizes users to poorly rate a competitor's review recommendation and/or rating highly those of its own product. Conversely, users may be incentivized to provide highly negative reviews about a competitor's product and/or rating poorly a negative review about the (unscrupulous) vendor's product. Statistical analysis can automatically reveal a suspicion of potential abuses of rigging the review ratings regarding a particular review and/or product but even with fairly sophisticated automated machine learning tools for detection (e.g. Bayesian or neural net techniques), suspicions are only good for what they are, e.g. statistical outliers from the norm, incongruities or gaps separating one group from another, yet these could be (in theory) related to differences in opinion. Confirming such suspicions much less identifying (with reasonable confidence) culprits is a whole different (more tricky) challenge. Abuses such as this may be more difficult to achieve if there are particular correlations preemptively designed into the statistical analysis algorithm such as consideration/evaluation of repetitive patterns in the sources (user raters) which correlate them to detected suspicions (particularly if these are associated with a particular product or products from a particular vendor) or if there is a trend (more conspicuous than average to generally favor one vendor's products over another).

Another strategy is building greater scrutiny and control over the source of the ratings a priori such that appropriate remedial actions can be taken quickly. In one approach, which could be an initial "first line of defense," ratings and their sources (user raters) of statistically detected "suspicious ratings" are taken off-line at least until further investigation can be performed if same becomes warranted. One potential challenge to be considered in this approach is that unless there is a plethora of rating data, while statistical incongruities may be detected, pinpointing which (the reliable versus the skewed) ratings may be tricky, that is, unless there is a prior pattern in the user raters for such suspicions. Naturally, in this approach, the "suspicion threshold" would be lower for user raters who had either been vetted and credentialed by the system as being "trustworthy" and/or who had been contributing uneventfully with few or no suspicions triggered for a substantial period of time. In this way, upon detection of a suspicious rating evaluation, statistical outliers from either the prevalence of ratings or from those ratings which are from sources which can be assumed more reliable than the others can be used to help pinpoint the actual culprits.

Another approach may be considered (assuming suspicion surrounds only the review ratings and not the review itself and/or if for example, the above approach is inadequate to either completely/accurately detect or keep ahead of abuses). Instead of the primary measurement criteria of quality of the review recommendation being attributed directly from user ratings of the review recommendation itself, they are derived by proxy from ratings ascribed to the review writer (predictive review ratings). This strategy is explained further below. In any event, with regards to the primary embodiment of using explicit ratings for review and recommendation rating evaluation, it is naturally assumed that such suspected abuse results in a likely skewing of the rating values of the associated product recommendations. It is also assumed that the above suspicion response measure of first detection, identification of likely culprits and suspension of their (rating) input into the system (at least until further verification of the same can be investigatively performed) may be tricky and therefore may not accurately or immediately recognize actual suspicions from "false positives." This fact alone may tend to encourage further abuses. Therefore, the first line of defense would be if there is sufficient data to separate the suspicious ratings from the non-suspicious ones, to remove the suspicious ones (even basing such removal on a low suspicions threshold). In particular, monitoring and attempting to eliminate the culprits is an insufficient initial remedial first line of defense. For example, if sufficient data does not exist to confidently/accurately be able to separate the two groups of ratings, if the untainted group is statistically sparse or low confidence and/or if statistical analysis ultimately demonstrates the fact that the predictive measure of the review (particularly for reviews of that specific reviewer) is as (or nearly as) accurate as the use of direct user ratings of the review (adjusting in the direct user ratings accuracy level for the correction to the accuracy measure vis-a-vie the above remedial strategy), then it would be reasonable in the case of suspected abuses surrounding that review to lower the suspicion threshold (to include at least initially also the false positives) and for those reviews at the moment they are flagged to instead be rated by the default measure which is predictive ratings (rating of the review to be determined by proxy by the rating of the reviewer him/herself). This strategy of predictive review ratings by proxy of the reviewer may also be used as an alternative strategy to the first line of defense strategy (above) or possibly in an alternative variation, and there may be reasons and scenarios to utilize that methodology in lieu of the primary embodiment above (of review ratings by explicit/direct ratings). For example, if the method for explicit ratings of reviews and the abuse detection means proves to be of more limited effectiveness in preserving accuracy of all reviews and review recommendations all of the time and encouraging the same and/or there exists an unacceptable incursion of abuses surrounding a given product, vendor(s) or category, the predictive rating (by proxy of the reviewer) may be strongly considered. A similar strategy may be used for statistically analyzing and monitoring reviewers themselves based upon suspicious patterns such as anomalous statistical predisposition towards a particular vendor's products or other patterns of potential suspicion (in light of questionable/uncertain history or little history to support a long-term positive reputation of integrity).

This approach would also seem to put more control over credibility of the review recommendation's rating by making it dependent upon the rating (thus credibility) of the review writer. It is envisioned as a basic assumption of quality assurance of the overall system that the review writer can be checked and vetted (perhaps periodically) in advance such that a certification of credibility of sorts is required as a pre-requisite to actively engage in the review writing and recommendation process. Such screening/certification procedure could include such assessments as demographic assessment, credit history, criminal listing, driving record, personal references, personal interview, etc. One safeguard against this activity is to have designated anonymous Woddles "agents" amongst the reviewer and user (rater) population and/or to include the offer of a bounty for any forthcoming individual providing information which would implicate corrupt vendors or viewers or user (review/recommendation) raters. Penalties such as suspension (temporary or permanent) of Woddles participation privileges or (for example, for "minor infractions") low search relevancy for the product of a vendor which is implicated are possible viable strategies with which to preemptively combat and discourage such activities.

Still, user ratings are important in establishing the overall reputational quality of each reviewer within a given category, so, resource limitations not withstanding it would be most advantageous for the users who provide the ratings to the review recommendation to be similarly vetted, or a higher relevancy, to be attributed to ratings from users who have been appropriately vetted in advance. Thus, in the interest of maintaining informational integrity/trustworthiness and quality/consistency of reviewers' opinion ratings statistical analysis to identify anomalies in the user ratings data (for a given product and across different products for a given reviewer) is important as well as for potentially recognizing the possibility of bias (or initial patterns of bias) for products the reviewer assesses.

Reviewers who achieve the highest overall ratings for objective number and/or their reviews have received the highest ratings are rewarded by their review(s) receiving a high prioritization in search ranking for reviews. Because link to the product which is recommended are embedded in the review, this equates to high online sales volume visa vie that embedded link which, are, in turn, commissionable to that reviewer. Secondly, once the high category ranking of the reviewer has been established she/he will preferentially be offered additional opportunities for the secondary primary review function which is to rate (via reviews) high profile products/services as explained above.

Cross-application/website interoperability of the online marketing service system is a very important functional and practical component of the present system architecture in that the exemplary implementation of the online marketing service system up to this point has utilized a single site based platform for all categories of products, services and companies. A single-site aggregative model has been proposed which lends itself to a search engine based navigational system architecture. However, as is a well-known current market trend, reviews and ratings which constitute the online marketing service system are a form of social media which lend themselves to a variety of types of social media platforms and very often category specific sites with social media content, as is shown in the Log In Options from FIGS. 2, 5, and 6.

Therefore, in the preferred implementation users would be able to use their user name and access codes which they use to access their private accounts in closed social media sites such as Facebook, Twitter, Pinterest, Blogger, etc. in order to also become logged on at the same time into WiseOwl (i.e. login to WiseOwl via their social media log on information). This multi-account access would technically enable users to be able to access and use the WiseOwl service as a direct link from a Facebook review which the user wishes to access, link through from, make a purchase of the associated product or service and ultimately rate in response to the experience with that product or service and/or become a certified reviewer in the future. In this way, the WiseOwl system could be as simple to subscribe to as simply an opt-in option from another social media site. With system/platform integration (which would have to be pre-agreed) with other closed social media platforms, it may be possible to enable access to these other social media platforms once a user has been logged on to WiseOwl. In another variation in which the objective is similar (not withstanding universal access to a group of other social media platforms) the user could when logging in to WiseOwl actually be physically logging in to the other social media platforms login screen (e.g. Facebook) which by signing in would effectively sign in the user to WiseOwl even though she or he has signed into Facebook. If the WiseOwl service has an agreement with other social media sites (preferably all other primary ones) users could conveniently log in to WiseOwl either from the main search site or alternatively through any of the domain-specific sites or via a non-private social media site review page and gain access to any of the other social media sites which are of preference to the user or which are befitting to the user for purposes of reposting the review. This multi-social media site (cross-platform) integration is of value from the standpoint of users conveniently accessing reviews from a Woddles or WeAreYour site and being able to repost it quickly and efficiently on any of the other closed social media sites or alternatively finding a WiseOwl review that had been reposted on one of the other closed social media sites and reposting it by the user on a second closed social media site which is advantageous in as much as it would to further incentivize reposting activity of the sort with a small share of the conditionable revenue from the sale of the product or service which is observed to have occurred as a result of the ultimate customer's reading of that review. Because such commissionable revenue sharing requires the reposting user to be subscribed with WiseOwl, notice of such an offer (and required WiseOwl subscription) would need to be mentioned in conjunction with the review. In this scenario the user is both logged in to WiseOwl as well as the other closed social media site which he or she is currently visiting and thus his or her reposting activities can be directly monitored. The tracking of online activities within the other social media site may require in general active software integration with the other site's platform which essentially functions as a listening platform.

Multiple Domain Social Media Sites

The "WeAreYour" System

The preferred embodiments of the proposed invention consists of either the single search site for the online marketing service system as was previously detailed above or a series of social media based websites which are domain-specific (e.g. to particular products, services and/or companies) or alternatively a single search site which is universal (domain neutral) used in conjunction with multiple domain specific sites which may for example be linked from the universal site providing individual search and or menu-based navigational capabilities as well as a platform through which consumers and reviewers may become subscribed as members to the overall system in general. It is conceivable that individual product and service domains for which such category specific sites are created could include for example, "WeAreYourAutoInsurer.com", "WeAreYourStockBroker.com", "WeAreYourRealEstateBroker.com", "WeAreYourLawyer.com", "WeAreYourBookSeller.com", "WeAreYourHealthInsurer.com", "WeAreYourPharmacy.com", and/or "WeAreYourConsumerElectronicsCompany.com". As noted, the above site domains include both product and service companies. It is clear that reviews and ratings for products and services are of keen interest to consumers such as which is the top-rated product or service in category X, what is the rating (and comparative ranking) of product or service Y, as well as establish the rating metric according to overall value or overall quality. In the multiple domain site scenario (the WeAreYour sites), it is possible to implement the same type of search or menu-based navigation system as in the universal single-search site implementation. It is possible to furthermore implement the use of the collaborative filtering module which enables a user to find a product or service which is rated according to the criteria that an individual or group of individuals who are most similar to the user in accordance with the criteria statically relevant in that particular domain. This process may be as part of the search (or other navigation) functionality such as part of a means to obtain general or comparative rankings from search results or other navigational outputs or the input string items. For example, of all of the products or services in a particular category/domain the collaborative filter would be able to identify among the attributes which are most significant in predicting preferences of any given customer within that domain who are the reviewers who are most similarly correlated to the given customer according to those given attributes and then re-rank the products/services according to the explicit or predicted ratings of those reviewers. This will give a ranking and a rating score which is unique to each customer (although it may sometimes be very close or indistinguishable from overall scores depending upon how significant personal preferences play into a given category domain as expressed by the reviewers of that category). In another approach the collaborative filter could simply extract the individual reviewer from the cluster of reviewers the one which is most similar to the customer according to the meaningful attributes that predict preferences in that category. For example books, music, movies, video games and even consumer electronics may vary somewhat subjectively according to a person's unique tastes and preferences or there may be additional variation according to socioeconomic, cultural, age, or geographic factors which may be picked up statistically by the collaborative filter. Certain of the above factors may be manifested in functional or practical factors such as might be the case in vehicles. For example in which a young, single male may be driven more towards style, appearance and sportsmanship where as a young mother is going to be driven by other practical factors such as convenience, safety, affordability, fuel efficiency and room.

Woddles' differentiator: Woddles' review and recommendation business model pays the reviewer. This will necessarily require Woddles to authenticate its reviewers, and to engage its members to create a picket fence monitoring committee to report on false reviewer candidates and wolves in sheep's clothing. Strong member-created monitoring committees are common in authentic social networks. HysterSisters.com has one as does Mothering.com, and both are known to Woddles' founders.

The manner in which the reviewers will be paid is this: when a sale has been caused by a Woddles' review, the reviewer will be paid a commission by the company whose product was sold. Maintaining these measurements will not be particularly challenging given the high level to which digital data analytics has risen. Companies such as Radian6 and other listening platform companies have virtually invented the means of instantly capturing all sentiments concerning the brands and the influencers who email, text or tweet the sentiments by spidering and scraping the Web, the Internet and Twitter, uploading all messages to the cloud and pulling down the data for slicing and dicing purposes, and then sending it to the brands. The challenge will not be in the analytics, it will be in introducing a new review and recommendation model. The challenge will be in pulling the 2,500,000 active Yelp reviewers and the 1,200,000 active Angie's List reviewers over to Woddles. The offer of being paid is one method, but there is a second, and that is via gamification. But, first the Woddles business model is described.

Rate and Rank:

WiseOwl has purchased a very large number of domain names that begin with the phrase "We Are Your . . . " and ending with the name of a large profession or industry. The professions have to be in the billions of dollars annually. For example, it owns the domains names www.weareyourlifeinsurors.com, www.wwareyoucarmanufacturers.com and www.weareyourcommercialbanks.com. The purpose for doing this is to create approximately 100 central markets for the brands to meet and engage with the members/reviewers. Engagement and participation is what the brands wish to achieve in social media, and for which they will pay generously if they indeed achieve it.

That Would be Enough to the Model, but There is More:_What is missing in the digital review and recommendation models is a rating system. There is one for stocks—the Dow Jones Industrial Average. There are many for entertainment—the Oscars, the Academy of Country Music Awards, the rankings of records sold as ranked by Billboard. There are several in sports—the box scores in baseball, the sectional scores and rankings created by the BSC for college football. And there are the Nielsen Reports for television shows.

What WiseOwl intends to do, once its initial business model—reviewing and recommending—is working smoothly, is to involve its members in a rating and ranking business. They will be paid, of course, to do this because it will require search and investigation. The goal of this rating and ranking exercise is to create social responsibility scorecards for all of the brands that have shown their desire to engage with and participate with WiseOwl' members in the review and recommendation side of the business.

The social responsibility scorecard will be known as the WiseOwl' score, and it will include the following areas of social responsibility:

The degree to which the brand is becoming green

The treatment of women and minorities, e.g., are they being paid as well as white males?

The number of rise in the percentage of women in senior management positions and on the board.

Granting paid maternity leave to women of at least six weeks

Granting time off with pay to women for emergency child issues

Ceasing the use of child laborers.

Compensating minorities and women for previous indiscretions

Permitting stockholders to vote for all directors one by one, and for the auditor Obedience to all federal regulations Philanthropic endeavors (or lack thereof)

Let's look at the first category: the degree to which the brand is reducing carbon emissions. This is done by sending fewer trucks from the brand's factories to its warehouses each day of the week. Reducing truck shipments is done by cubing and pouching, two revolutionary steps in logistics and packaging that are currently being done. You go to any supermarket and see that StarKist is moving from putting tuna in cans to putting it in pouches. General Mills is packaging Uncle Bens Rice in pouches. The number of trucks leaving the brand's factories every day can be counted by someone physically observing the factories. Carbon emissions are also reduced if employees car pool, and if they do more Webinars and fewer in person visits requiring airplane trips. That is just one example of how Colgate will be compared with Clorox, Procter & Gamble and Tom's of Maine and how Nestle will be compared with Unilever and Mars. And, the gatherer of that information will be in competition with others to collect it more accurately, faster and with double and triple checking of facts. This is the gamification feature; i.e., making a game out of collecting socially important data, with hefty rewards to the players and even heftier rewards to the winners.

If done authentically and with double checking and triple checking all members' contributions to look for and remove personal issues of retribution, the WiseOwl rating and ranking system will become as important as the DJIA, Major League Baseball's box scores and other critical American scoring systems. The goal is to have the CEOs of every major corporation in America ask his assistant every morning of every working day, "What is our WiseOwl score today?" And is our WiseOwl score the highest in our industry group?"

Practical and Logistical Considerations in Designing the Ratings and Reviews Scheme for the WeAreYour Business Model In the "WeAreYour" business model, we provide individually category-themed social media sites, sort of sub-categorizations of the single-universal search site referred to as Woddles which is extensively detailed above. In the WeAreYour system the business model lends itself particularly befittingly towards the type of companies within the consumer domain which are services as well as large product manufacturers. Services may range from major corporate providers such as financial services, banking, real estate brokerages, health, life and auto insurance to much lower level services such as those that might be found on Angie's List. It may include recreational entertainment or tourism related services (travel agencies, hotels, restaurants, resorts) among other categories. Non-services such as retailers and products are additional sectors. Providers of large corporate services and large product manufacturers are particularly befitting in as much as large corporate services such as insurance and financial services are both major commercial sectors, represent large commercial transactions, are provided by large corporations. The WeAreYour system seeks to provide the product review and rating component described in Woddles as well as providing ratings for corporate factors which are of interest to consumers and investors with which relatively large transactions will be made. Such corporate factors may be defined as social consciousness factors as well as political factors (political agendas and supported politicians). These are explained further below. As with the Woddles business model, user reviews and ratings may be provided for products and services of each company. In addition, social conscience and political factors may be individually rated just as ratings are performed on quality and value of products and services. The one additional factor which must be considered in view of the fact of social conscience factors and political factors are considerably more multi-factorial is that if the category involves a large number of companies, it may be advantageous to provide a search interface by which factors may be used as a ranking criteria for companies in a search (even more than one factor may be used in this case). The ranked companies in the search results would be associated with their respective social and/or political factors associated with that company's scores (first and foremost those entered factors upon which the search was performed). Within the services sector it is conceivable for example that certain known key variables as recognized correlates to predicting overall customer service quality (as well as quality of customer service itself) may be rated in this way as well. With regards to retailers, tourism, restaurants, etc., product ratings as well as service ratings would certainly be relevant. While with most product manufacturers product ratings and reviews would be the most relevant exclusively and in traditional services, companies obviously quality of service is most relevant. However, typically in most cases their services are loosely defined as products and so product value and product quality are often relevant as well. Conversely, while social conscience factors tend to be of particularly high interest to consumers with regards to companies of a large transaction type, e.g. financial services, insurance, banking, brokerages, etc., large product manufacturers, large food producers, auto makers, etc., would also constitute a good category for not only product ratings and reviews but also company ratings and reviews in as much as they are large corporations and constitute either significant transactions or multiple smaller ones which affect the consumer purchasing decision activities to some significant degree. Utilities and petroleum, energy companies on the other hand would be of primary interest for corporate factors while utility and energy companies specifically would be of interest as far as customer service and value as well. The same could be said before cable, internet, and telephone companies whose customer perception would also be affected by product, customer service and overall value. As far as social conscience factors and political agendas, it is the case for particularly high-profile companies to create a public image which is seen by the public eye somewhat through rose-colored glasses. Issues with regards to employee and even ethical business and investor fair practices (as well as particular political positions and agendas including ethical and political dealings) tend to be well-concealed for obvious reasons. For this reason, we wish to create a social infrastructure which encourages and supports consumer watchdogs and whistle blowers. Thus initiating and preserving full and complete transparency and revelation of these factors and potential negative practices to the public eye vis-a-vie "insiders" within the company and/or consumers or even employees within other companies who are "in the know" to the true and realistic business, managerial. As such this social watchdog infrastructure will ultimately have the net effect assuring a higher level of business ethical and human resources/managerial accountability. This openness should enable employees and even investors and consumers to be provided with information and revelation of internal affairs similar to that which tax payers might expect from the federal government.

Traditionally whistle blowing has been an activity which has been avoided by employees at almost all costs due to the potential repercussions and general office political perceptions and stigmas ascribed to such individuals as being disloyal to the extreme (almost certainly resulting in loss of one's position) and thus has been relegated as a measure for only extreme or egregious cases of abuse, mismanagement or irresponsibility deception or malfeasance within the corporation. The current perception of employees engaging in whistle blowing or general watchdog activities to ensure transparency and maintain overall corporate accountability is a far cry from this. Therefore, we have proposed a solution within part of the social infrastructure which allows for such monitoring to occur with reporting and rating of the reports as well as the various social consciousness factors and political factors which are of concern to employees, consumers and investors. The proposed solution involves a means for reports to be submitted by employees of the company or associates of corporate members, even employees of competitors which pertain to any of the social conscience factors or other stated (or unstated) criteria which are pertinent to ethical, legal, regulatory, social or customer or business best practices as well as political or particularly where there is a known lack of transparency to public disclosure. These reports (referred to as investigative reports) may be rated by other associates of the submitting investigator as to its accuracy and reliability. In the preferred approach, the investigator over time also may obtain a reputation based upon the degree of reliability and accuracy of previous reports as rated by associates. Therefore it is preferred that his/her rating of credibility is established vis a vie his/her history of submitting accurate and reliable reports. Like a reputation system, the reliability and accuracy weighting value of the investigator accrues, increasing confidence as to whatever the average reliability and accuracy value is determined to be as more reports are submitted. This in turn becomes a secondary weighting factor to affect the score of any new report which he or she submits. This is important in that new reports which are submitted or reports on situations or events that cannot be verified through other means (at least not initially), can only be scored according to the reputation of the investigator submitting them. If/When initial ratings of the report occur, the ratings of the actual report would take a higher weighted relevance in the effective score of the report of the reputation of the investigator. The only exception to this may be an outlier case where the reputation of the individual may be good, but the initial rating of the report submitted is very poor (where further subsequent verification ratings of the report may be warranted). In addition, the individuals who provide the ratings of the reports themselves ideally have rating-based reputation scores from their own investigative reporting activities or alternatively have been rated as to their own credibility by colleagues. This is to ensure that ratings which affect the accuracy and reliability of reports (and by reference, credibility of the individuals submitting the reports) are credible (and if not, an adjustment factor may be applied to compensate for same). Unfortunately, as is not the ideal scenario, it is likely that report submission in many organizations (particularly initially could be a less-than-common occurrence). Therefore because many employees submitting any given report at any given time likely lack a history of report submissions (thus reputation ratings via those of the reports they submitted), we also propose a secondary means in which reputation ratings may be "initially" provided by associates who have a credibility rating. Then as rated investigative reports are submitted, their own reputation score incrementally subsumes the previous (human attributed) score vis-a-vie the aggregate score of the reports submitted.

There is one overarching problem which still remains to be addressed in this scheme which is that invariably there will be internal opposition to any given negative report given about a company such as from the higher ranks of the company or those who are loyal to the company to the disregard of the greater good. For this reason, a proposed technical approach is provided which allows investigative reports as well as ratings of individuals (investigators) which includes those who rate the investigative reports (indirectly, rating the individuals) as well. The presently proposed software-based technical platform in its provision for the above proposed rating and reputation system identifies users (which contain rating scores) under "user id". It is obvious that one could simply associate the user id with an alias (or pseudonym) and that because the WeAreYour and Woddles system is trustworthy from the standpoint of protecting the confidentiality of the actual user (as would be known in the user account information) such an approach would ensure that any watchdog or whistle blower activities would not be able to be traced to the actual user which initiated with the same, for example by the company (or other employees) associated with the investigator. The obvious temptation in this scenario is for agents or sympathizers of the company to exploit the weight of their own credibility to discredit the contents or allegations of reports and/or direct reputation of the associated investigator (particularly if it is of significant importance and/or corroborating sources are limited). In such cases it is very likely there will be significant disparity between the reputation of the investigator and/or his report and that of those who rate the report (and very likely between ratings of other associates and those intending to discredit the investigator and/or the associated report). In such cases, an independent investigator may be summoned on behalf of the investigator to clarify the discrepancy and/or arbitrate the conflict.

To ensure protection against libelous comments, WeAreYour would take a very strict stance of not interfering with its investigators allegations. It will be WeAreYour users' responsibility to accept all legal repercussions for allegations and thus indemnify WeAreYour and Woddles LLC. Therefore, WeAreYour and Woddles LLC will not held accountable for libelous comments. This will be stated in the users Terms of Use agreement. WeAreYour and Woddles LLC will not be held accountable for any third party investigation conclusions as a result from a user's comments or effect on his or her reputation.

Virtual Trade Show Idea as a Revenue Source.

It is relevant to the WeAreYour business model to address economic considerations, namely the revenue model and associated revenue sources. The WeAreYour business model enables consumers and reviewers to exchange information and transact within a domain-specific virtual social market place. There are a collection of virtual social market place activities to attract consumers, thus indirectly as a result also reviewers, who can be compensated for commercial transactions in response to their reviews. As a result, reviewers are doubly incentivized to provide the best, most competitive reviews, which will ultimately give them optimal credibility and thus exposure to more potential consumers. This is why in the preferred embodiment the WeAreYour system utilizes substantially the same search system for reviews as the Woddles search system. This functional overlap lends itself well to a single search engine database which can be accessed for products, services and companies regardless of which site (Woddles or one of the WeAreYour sites) the user is performing the search on. This approach can efficiently and seamlessly implemented so long as the search engine is able to efficiently recognize the domain of information the user is searching for (i.e. company, service and/or product and the category thereof). One obvious way to more efficiently bias and thus direct the search according to the user's intentions, is for the search query to automatically incorporate the website which the user is logged in to while performing the search (i.e. the Woddles search site or one of the WeAreYour sites).

The virtual trade show concept is one of the novel and engaging activities which allow consumers and reviewers (and their reviewed information and ratings) to interact and engage in social interaction. Up to this point, the interaction between consumers and reviewers has primarily been vis a vie consumers accessing reviews, rating them, and engaging in purchasing transactions in conjunction with those reviews. It is conceivable in the various implementations of reviews in Woddles, the WeAreYour sites, and across the social web, for prospective consumers to gain direct communication access to reviewers (e.g. for writers of those reviews which are particularly interesting or helpful such as through the review, the user name associated with the review, request to the service, or any other standard means available through the particular social media service at hand). However, it is most befitting for direct communication, possibly real time communications, to be engaged in using the virtual trade show platform. Some additional ancillary activities could include virtual meetings, scheduled in advance with one (or multiple) reviewers potentially in direct (or collaborative) dialogue about a product (or service) or ideally competitive products (or services) or perhaps even the collection of primary competitive products or services. Such meetings could include text, voice or video conferencing and they could include such additional audio/visual services as PowerPoint presentations and live demos (e.g. by product or service representatives). It is even conceivable that interactive exchanges involving competing products could include such things as live debates between product/service representatives and/or reviewer advocates of different competing products/services. These interactive fora would lend themselves to scheduled times. However the virtual trade show and its various services, features, multi-media content, and reviewer and representative information could be accessible persistently on a 24/7 basis.

Due to the anticipated popularity of virtual trade shows, the associated WeAreYour sites will likely become primary locations for reviewers to realize sales transactions (and associated commissionable revenues) associated with the virtual trade show.

Another implementation is to provide links from the general Woddles search site or one of the WeAreYour sites to various virtual trade shows either directly from the site, or in conjunction with advertisement-type links associated with search queries that pertain to the virtual trade show that is presented, and/or links from specific products or services that are accessed which relate to the specific virtual trade shows to which they are linked. As is consistent with the search system architecture (above) the collaborative filtering module will help to personalize the selection of results generated from a given search query and it is conceivable that even in the absence of search, the links to selected virtual trade shows can likewise be personalized in general to the user's individual interests.

It is anticipated that users will tend to repost a significant number of reviews distributed across the social web if a reviewer possesses a significant ratings score (thus achieves prominence in Woddles or WeAreYour search sites) or category-specific selective prominence, or even exclusivity, of exposure within the virtual trade show. It is possible that externally posted reviews will provide links to other related product reviews that the reviewer reviewed or possibly virtual fora within the trade show in which at least some of the competing products were also reviewed by the reviewer. With this in mind, it is conceivable that some reviewers may become facile in learning to create reviews in which more than one product are reviewed and rated in general and compared to one another (such as according to value and quality). Various features or attributes, strengths or weaknesses, and/or appropriateness for particular types of users may be indicated. The multi-product/multi-score review would of course be utilized as a source for product ratings as they would with a single product score review.

Gamification as an Additional Revenue Source

There may be advantageous ideas for revenue sources in a virtual trade show environment in the area with regards to gamification with regards to enabling reviewers to compete with one another (and also with regards to making the opportunities for competition and/or achieving certain benchmarks correlated to rewards. Certain prime opportunities for reviewers to be able to influence consumers in masse such as in a virtual trade show or virtual meetings could be preferentially offered to certain reviewers based upon the quality of the reputation of the reviewer over other reviewers (which is a general sense provided in the review ranking scheme under the Woddles section). Another criteria for allowing preferentially such opportunities could be based upon the degree of salesmanship success within the virtual trade show context or alternatively throughout the Woddles, WeAreYour and greater social network environment in general. Such preferential opportunities may be as a result of practical limitations in the capacity of the virtual trade show compared to demand by the reviewers to participate or the reward to successful reviewers may be simply preferential exposure (e.g. during live events or in terms of the degree of exposure or ranking priority of the reviewers reviews.

Another idea for the gamification concept could involve the integration of a social game in which reviewers would actually compete against one another using the social game. In one variation the relative success of a reviewer compared to that of his/her peer competitors could be observed graphically on the social game itself. In an abstract example of this if the social game were a Monopoly board game implemented online, the progress moving forward on the board game would be reflected by the degree of success (e.g. quality of review recommendations and/or sales/click through). In another variation, the overall success of the recommender provides some sort of advantage (e.g. extra points, extra turns, better probability in a chance component of a game). Monetary rewards, prizes, etc., may be associated with such a scheme and because reviewers (particularly the top-rated ones) are highly visible individuals to consumers visiting the service (and seeing their reviews across the social web), the very notion of gamified competition among reviewers would be an additional attraction to potential consumers (which would in turn will fuel visibility and exposure of the reviews and the services and or products being solicited.

Alternative Embodiments

The fundamental system architecture as described in the proposed invention contains a number of system elements which are configured in a novel fashion to be able to effectively address and solve the above stated problems. It would be obvious to one skilled in the art that the concept of the proposed solution is well befitting to address similar related problems in a way which is novel and efficacious beyond any current prior art methods. Such analogous problem sets are quite broad and the examples herein proposed are in no way intended to limit the scope of the potential range of applications possible. At a general level of abstraction, the reputation module and system of the proposed invention as well as the investigation module and system and the collaborative filtering model lend themselves well to being able to both credential and certify with relatively high confidence human experts in the form of reviewers who are extremely (technically optimally) proficient at rating specific types and categories of informational objects (in the illustrative embodiments, products, services, companies). However, it would be somewhat of a natural extension of such capabilities to apply such expert selection functionality instead of for rating or reviewing pre-identified information objects instead to the endeavor of finding or identifying information objects of a particularly high or optimal degree of a desired quality, value, or simply for purposes of recognition of particularly desirable characteristics or capabilities (such as from a plethora of possibilities). Moreover, such ratings could conceivably be either subjective as well as objective, according to certain desired qualities or characteristics, for purposes of categorization or assignment to particular tasks, roles, or certain skills or proficiency ratings. It may be toward the identification or recognition of latent potential, such as predicted quality, popularity, success or potential (such as of product/services, companies, fledgling companies, students, scholars, professionals, artists, musicians, political candidates, and the like). In addition, the use of the collaborative filtering module would be particularly befitting if applied as an adaptive learning and data analytic tool (such as utilizing clustering methods) to identify among collections of experts and informational objects, which objects or types of associated characteristics thereof best exemplify experts who rate them for purposes of predicting which experts would be most suited to evaluate other informational objects (including those informational objects which may not be directly characterized or classified according to those which the expert has been demonstrably shown to excel in rating. For example, if objects in Category (or with characteristic) A tend to be rated with high proficiency by expert Number 1 and other experts who are similar to expert Number 1 by being able to proficiently rate objects in Category (or with characteristics) A also tend to proficiently rate objects in Category (or with characteristics) B, then expert Number 1 should also (predictably) be able to proficiently rate objects in Category B. Of course, there may be qualities or characteristics which directly describe a particular expert which are important predisposing factors in terms of predicting what types of informational objects the expert would be proficient in evaluating. Nevertheless, this is a classic illustration of predictive data mining and the particular methods suggested in order to perform this correlative prediction are for illustration purposes only. By applying these types of techniques in predictive data mining to ascertain which object characteristics an expert likely has a high proficiency rating for, it is possible to anticipate which experts are most optimally befitting for a given rating and/or investigation task for any given informational object. It is possible to further determine with greater precision the degree of "befittingness" or rating value of the expert, a priori to the rating process (but for the predictive data mining aspect, this concept of rating the expert by the quality of his/her rating activities was explained in detail above). Of particular novelty would be the ability to find an optimally befitting group of experts (such as those who may share particular characteristics, predictive, or descriptive in nature) with which to perform a rating, review, investigation, recommendation and utilizing the present optimized matching scheme for informational objects and expert correlations, the experts as a group or collaborative effort could perform the requested task in some cases in an even more optimally efficient manner than could be achieved individually as a result of the collective dynamic. This proposed notion referred herein as "targeted crowd sourcing" would have a myriad of potential applications and could improve the very concept of crowd sourcing in terms of improving efficiency, statistical confidence of opinion rating, or other results and/or significantly reduce overhead by reducing the required participants to achieve such confident results.

Figure 22:
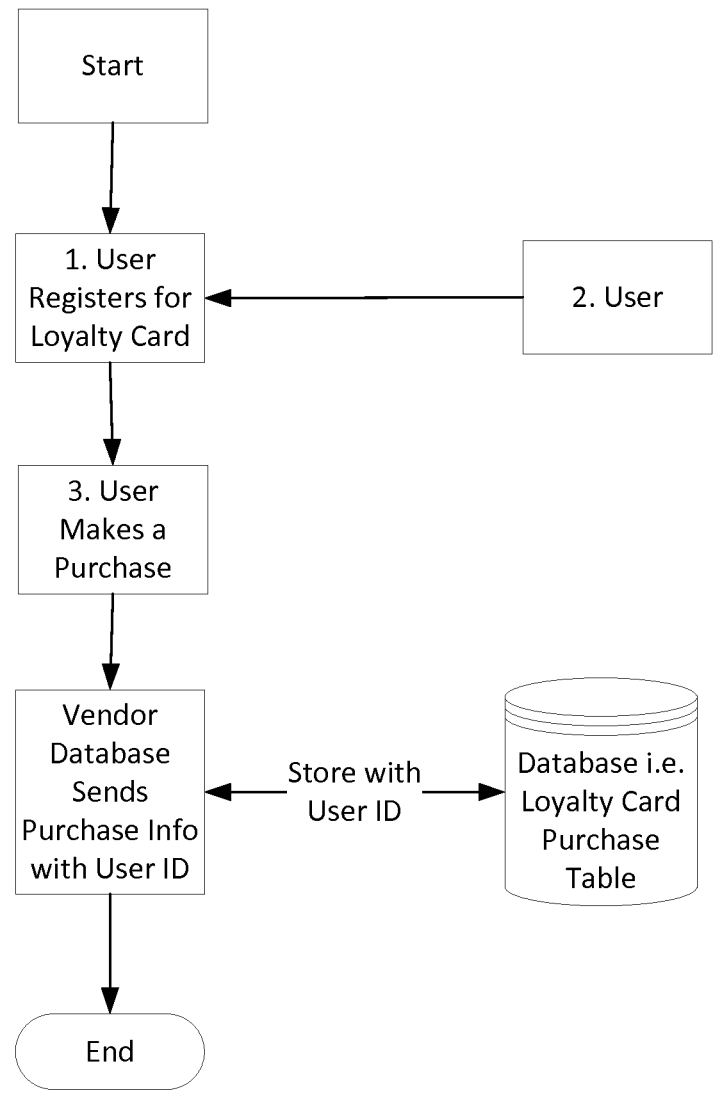
FIG. 22 illustrates how to use a loyalty card in accordance with the invention.
Figure 23A:
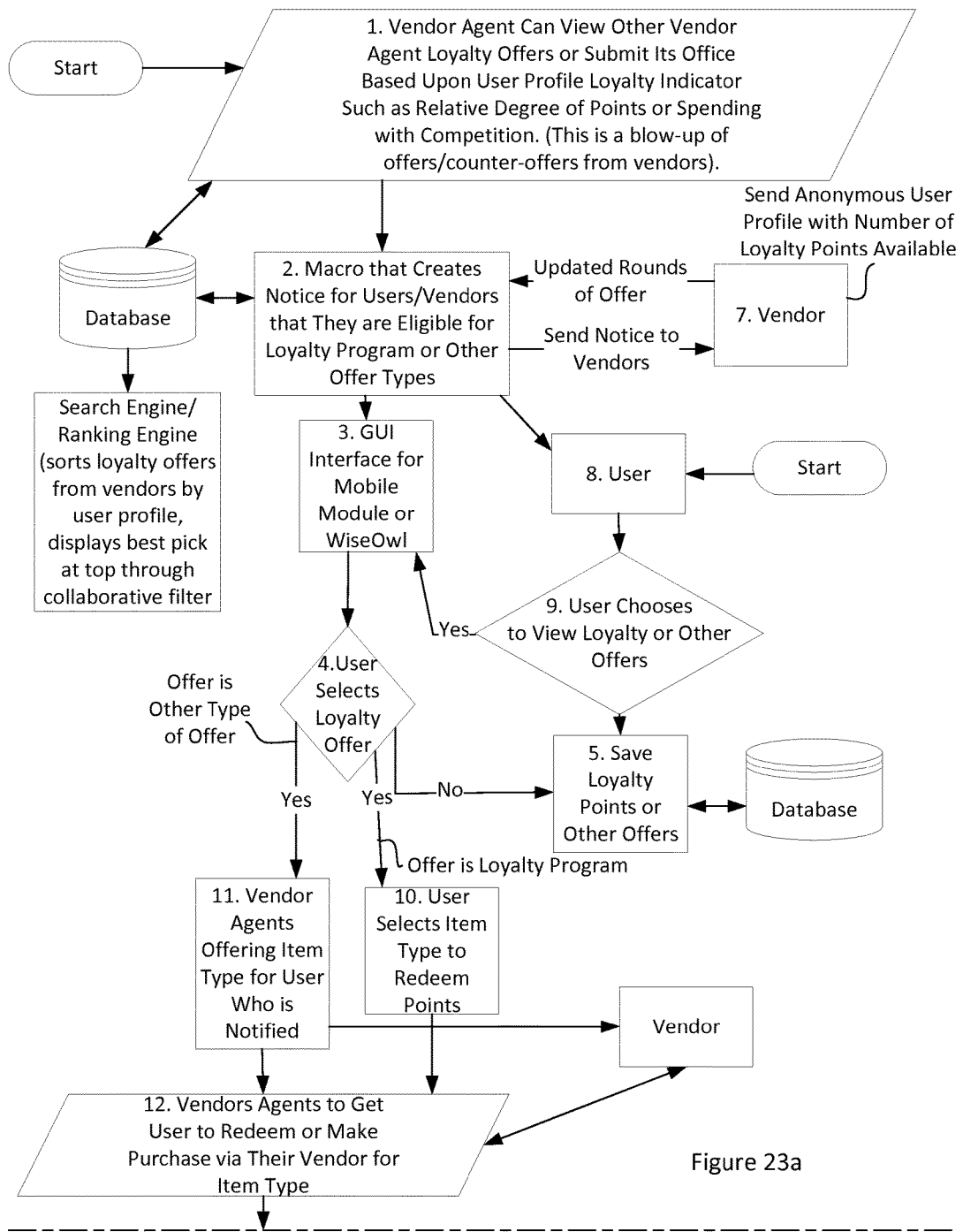
FIGS. 23a and 23b illustrate how to redeem a loyalty card in accordance with the invention.
Figure 23B:
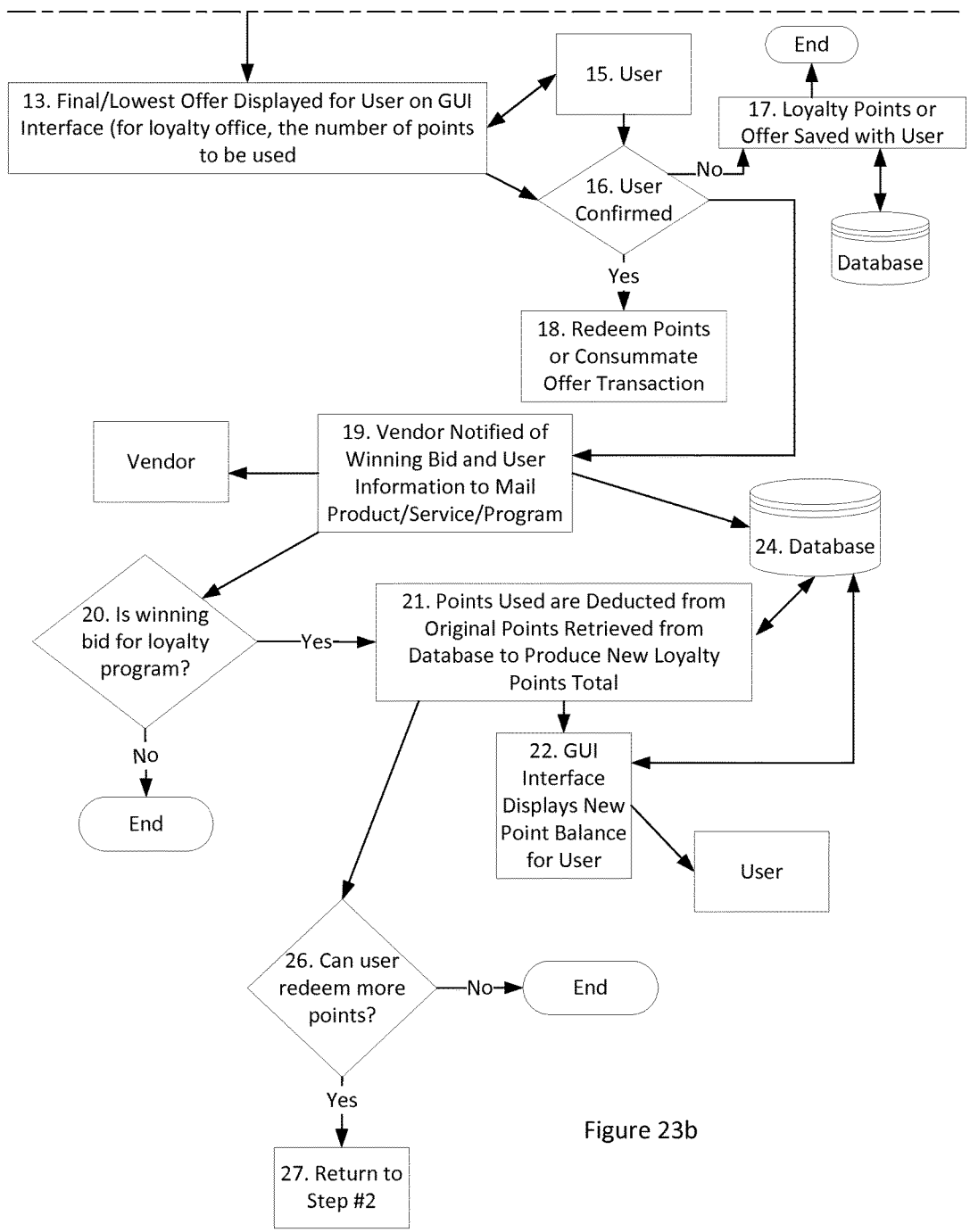
Figure 24:
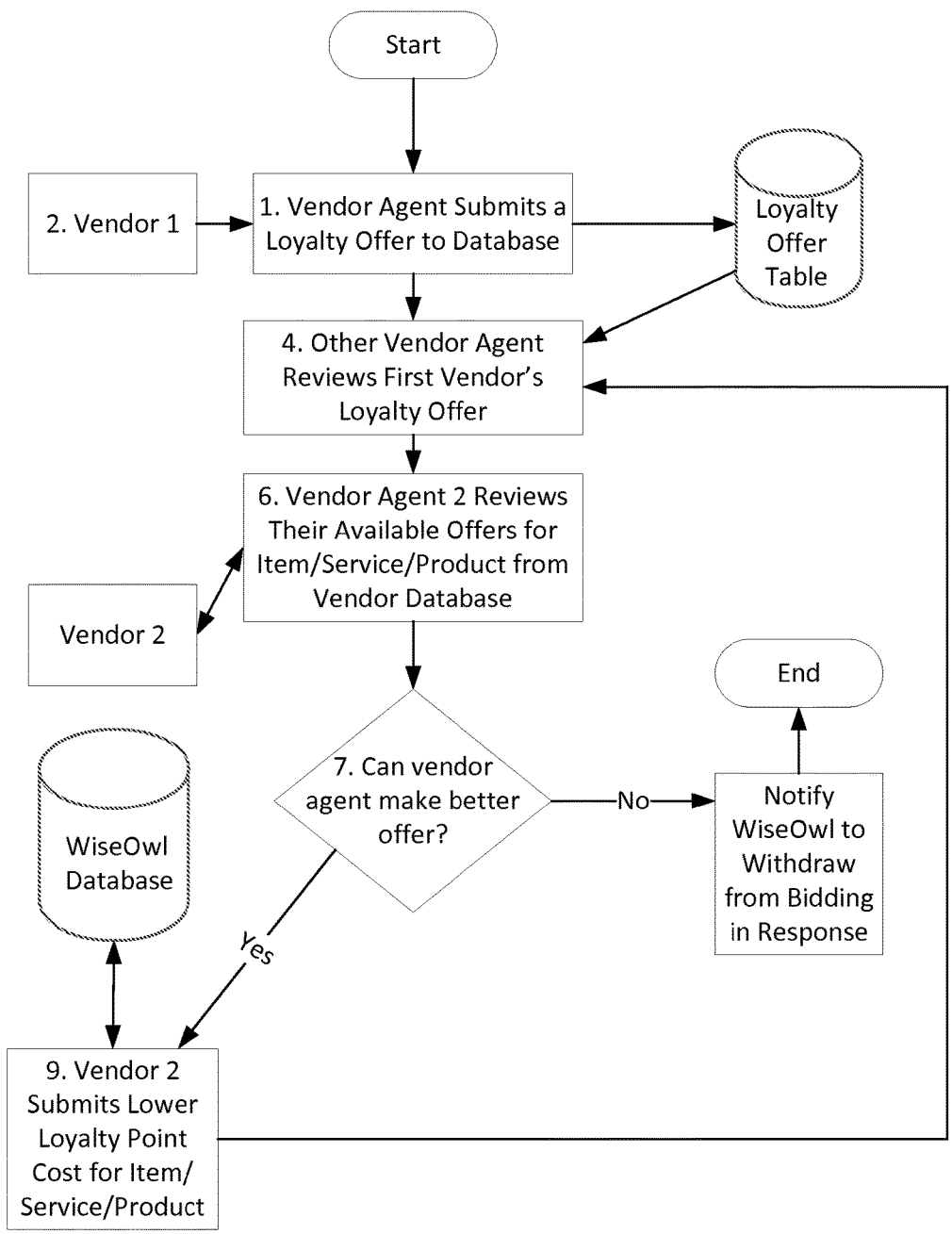
FIG. 24 illustrates an alternative way to redeem a loyalty card in accordance with the invention.

FIG. 22 illustrates how to use a loyalty card in accordance with the invention, while FIGS. 23-24 illustrate embodiments for redeeming the loyalty cards.

In FIG. 23—"How to Redeem Loyalty Card" the preferred embodiment described supports a platform enabling users (prospective consumers) who are shopping on-line, off-line or in mobile environments (in m-commerce mode or doing physical commerce such as in retail environments). It allows competition to occur between various vendor agents representing different competing vendors. They can compete with loyalty program or upgraded loyalty programs, features, offering and benefits. The platform described also enables offers, price discounts etc. to be offered in competition between vendors. The competition described can raise the reward through bidding as with number of loyalty points, quality (premium) level of loyalty program which the customer is offered etc. and benefits, including coupons, discounts and/or bid down (reduce) the cost of prices for goods or services. While the illustrative embodiment has been explained to explain in great detail how loyalty programs can be used as the offering type for competitive purposes between the vendors (particularly since some details are provided which should be used to properly cover this particular offering type), it is for described illustrative purposes only since the offerings can include any type of offering provided by vendors. Moreover, agents of the vendors respond to other offers revealed to them by competing vendors based upon business rules determining whether and what type of competing offers should be provided in response to any one or combination of several variables such as the degree (consumer benefits) represented by other competing offers, the degree to which the other offer(s) are of greater degree of benefit to the consumer, how valuable the customer is (or has been) to the vendor, how loyal the customer is (or has been) to the vendor, how loyal or valuable the customer is to the other competing vendor(s) and how high is the defection propensity of the customer. Other business rule variables may be considered by the vendor as well, of course.

In FIG. 23, vendors will submit their loyalty offers or view other vendors' loyalty offers so that they can submit a better offer from the Wise Owl database. There will be a macro which creates a notice for users and vendors for users that are eligible for the loyalty program or other offer and that will send a notice to vendors of anonymous user profiles with the number of loyalty points available for that user. The vendor will return with an updated list of offers based on the anonymous user profiles. Then the user after he/she is notified if he/she chooses to view the loyalty offers they will be sent to the GUI mobile module of Wise Owl. If they do no choose to view them their loyalty points will be saved with their user ID in the database.

The GUI interface for the loyalty offers will be either through the mobile module or through Wise Owl interchangeably which is shown on Block #3. What the GUI interface will display is the search engine for the collaborative filter and ranking engine working together with the database (Block #6) taking the updated vendor offers and the user profile to display the best offers at the top on the GUI interface for the users. Then the user has the option of selecting a loyalty offer (Block #4). If the user does not select a loyalty offer then their point may be saved with their user ID in the database (Block #5). In Block #7 if the user selects an item type to redeem the points (such as do they select their favorite product), then all vendor agents offering that type are notified in Block #8. In Block #9 the vendor agents bid against each other to redeem through their associated vendor. In Block #11 the final lowest offer for redeeming the users' loyalty points is displayed for the user on the GUI interface along with the number of points that will be used. Block #13 the user has the opportunity to confirm. If the user chooses not to confirm again their loyalty points will be saved with his/her user ID for later use. If the user chooses to confirm then in Block #14 the points are redeemed. In Block #16 the vendor is notified of the winning bid and the user information from the database is provided to mail the product, notify the user of the service or the program that has been selected. The loyalty points used are deducted from the original number of loyalty points that were retrieved from the database to produce a new loyalty point total in Block #17. Block #18 has the new loyalty points stored with user ID in the database. In Block #19 the GUI interface displays the new point balance for the user. In Block #20 there is a decision point for the program. It says can the user redeem more loyalty points. If the user can redeem more loyalty points they are returned to Step #2, which was the macro which creates the notice for users and vendors that the user is eligible for the loyalty program. If they cannot redeem any more points the loyalty card redeem program section is at an end.

As shown in FIG. 24, an alternative start for this would be the user can select to view loyalty offers if he/she is using saved points. In Block #1 the vendor agent will submit a loyalty card offer to the loyalty offer table in the Wide Owl database from Vendor #1 in Block #2. In Block #4 the other vendor agent will review the first vendor's loyalty offer. In Block #6 vendor agent #2 reviews the available offers for the item/service/product from the vendor #2 database. Then there is a decision point at step #7 which is can the vendor agent make a better offer. If no, in Step #8 notify Wise Owl to withdraw from the bidding process in response to this occurrence, end of process. If at step #7 the vendor agent can make a better offer then they go to step #9 where Vendor #2 submits a lower loyalty point cost for the item/service/product to the Wise Owl database (item #10). Then we return to step #4 of this process until not a better offer can be made by any of the vendor agents.

Consider Several Exemplary Examples:

1. Predicting the degree of success of a product or service while it is still in the pre-release stages (prior to the producer's full scale commitment to mass production, marketing, PR, etc.). Currently such market research endeavors involve, for example, focus groups that are time consuming, typically expensive, and involve a statistically sparse number of individuals (notoriously laden with concern of both non-representative consumer segments and/or lacking in sufficient experience or facility with regards to the product or service being offered). The proposed solutions potentially addresses all of these concerns and especially addresses the economic inefficiency/overhead concern by more accurately narrowing and targeting the most meaningful target segment of potential evaluators. Secondly and more of an aside, if as is proposed in the preferred Woddles and WeAreYour embodiments, the reviewers are also known influences in the social media market universe, the opinions of these individuals will invariably become almost by necessity have a significant impact on a very large segment of the potential consumer market of that particular product or service evaluated.

2. Finding investors able to provide expert advice in any given category is another alternative application illustrative of the present system architecture. It is conceivable that social media recommendations and advice provided by individuals could be rated according to the present scheme thus ascribing proficiency ratings to the provider of said advice according to the types of investments within particular categories, subcategories or with certain characteristics, for example. Where stocks or securities are concerned actual investor past success could become a primary rating measurement according to certain characteristics and categories as well. As indicated above, because the present scheme may establish expert evaluation ratings for largely predictive or future evaluation proficiencies, there may be a particularly advantageous application of investments to the subcategory of evaluating the potential future successes of startup companies such as may be observed and evaluated by a variety of venture of capitalists and venture capitalist firms (in which the use of the investigation module among other types of investments would be particularly beneficial). For example, the rating and evaluation scores could help venture capitalists (and the like) anticipate who on their team would be most useful to have (or invest in) their firm, which startups themselves are most likely to succeed, and/or which venture capitalist firms are most likely to succeed based upon its own proficiency score, that of its members and that of the firms invested in. In this application, startup companies typically possess certain discreetly definable characteristics, sector expertise of its officers/members, funding stage, requested funding amounts, development stage, risk profile, budget, growth potential, market potential, degree of barriers to entry, revenue to overhead ratio, intellectual property, strength, and the like. Some of these characteristics are part of an optimized formula for overall predictive likelihood of success and overall potential return on investments. Some of these characteristics define the profile characteristics which investor groups use to select which types of startups they would like to invest in and which ones they would not. But for the fact that some startups may be looking for certain characteristics in their investors as well, the ability to match startups by their characteristics to the desired characteristics of the investors that seek them would be a matching scheme which is directly analogous to the collaborative module and system to the proposed invention, which when incorporated with the investigation module and system would provide an efficient means of identifying and verifying startup companies according to characteristics which potential investors care about (including success propensity and differentiating characteristics) and would enable an essentially global database of potential investors and startup company candidates to be matched together and optimally targeted to the investor's preferences. The use of the reputation module would further give credibility to the ratings and information sources regarding the investigation module in procuring with confidence and certainty the discreet information and rated variables which are important to the investor and could thereby be certified and authenticated a priori that is to say (unlike any prior art protocol) in advance of such evaluation and due diligence procedural protocols which are standard evaluation practice for investors. While the investor would likely wish to do his/her own in depth review evaluations, the fact is that in theory procurement of those verifiable expert evaluated facts and rated characteristics which are important to the investor could save considerable time and effort on behalf on the investor. Performing such activities by proxy via experts who are rated and credible at providing the required information of a discreet or subjectively evaluated nature would also be a precursor step towards enabling start-ups (which meet the prescribed characteristics and/or certain minimum rated characteristic thresholds) to bid (using percentages of equity) for available amounts of cash by each given investor and/or reverse bid for the cash (as a shrinking commodity in reverse auction). Because automated agent-based auctions are most efficient (from the seller's/investor's perspective), assuming limits are provided (such as cash amount and/or equity amount on behalf of both parties to the intermediary (auctioneer) and the seller/investor defines preferential ratio and rates of cash surrendered to equity gained, the process could in theory be automated from the investor's side as well as even from the start-up's side. Such a process could also inure to the benefit of the investor inasmuch as traditional negotiations are not optimally efficient particularly from the investor's standpoint and in addition they are often time consuming and thus expend valuable time particularly on the part of the investor. Post-auction, verification of the evaluated information and characteristics could be performed, more as a formality protocol on the part of the investor.

3. Procuring and Rating Research Projects and Intellectual Property.

The methods of the proposed invention may also be usefully employed as part of a social network which enables experts (such as academics) in a variety of technical scientific and engineering fields to recognize and identify certain existing or proposed research projects and endeavors or alternatively intellectual property which is likely to have extraordinarily potential value in the future and/or significant unappreciated present latent value (as in the latter case). The characteristics and/or categories which describe the research or IP could be rated according to the prior proficiency in evaluating successes historically (and possibly according to additional categories or characteristics which credibly rated peers ascribe to the expert). It is conceivable that other extensions of the proposed system may be provided such as marketization in which such experts who are rating the projects and/or IP could pledge a partial (even small) monetary commitment to the developments and subsidization of the project or assets in exchange for an interest in the intellectual property (such as patents and/or commercial opportunities) Assuming that the economic interest is not overly generous with respect to the monetary pledge such approach would be another means (perhaps even more efficient approach) to perform ratings for the projects and/or assets (inasmuch as monetary commitments are likely to be more representative of the true potential or latent values. Likewise for this reason because of the latent time period for proving social/reputation ratings by proving out the accuracy of the ratings the present approach may be a most ideal approach for establishing with a certain confidence level the ratings for both projects and the experts performing them.

4. Other Applications

It is conceivable that the current system framework may provide a particularly useful way for which companies may identify and target individuals who are both particularly efficient and knowledgeable for purposes of direct sales, for example, for sales teams as part of a sales force automation system or to identify potential candidates of multi-level marketing programs. It would be particularly useful if combined with means for identifying and targeting those individuals who are the most significant "influencers" identified visa vie a multi social media listing platforms which listens across all social media environments.

Those skilled in the art also will readily appreciate that many additional modifications and scenarios are possible in the exemplary embodiment without materially departing from the novel teachings and advantages of the invention. For example, in one version of the Woddles system, once a user reads a review for a product of interest, a link may be clicked which allows the user to identify a bricks and mortar chain stores that carry the product and are within a given proximity radius from the user's present location. Accordingly, any such modifications are intended to be included within the scope of this invention as defined by the following exemplary claims.

What is claimed:

1. A computer implemented system that provides information rating the quality of products or services available for purchase from websites over a computer network, the system including:
   a processor;
   a display; and
   a memory that stores instructions that when executed by the processor cause the processor to:
   provide an interface to a search engine through which customers may initiate a search query to the search engine for products or services over said computer network, said search query including a desired effective quality ranking, R, for products or services provided by the search engine in response to the search query;
   process search results from the search engine responsive to said search query to rank the search results based on the effective quality ranking, R, of a product or service returned in the search results where R is defined as:

$R = w3*Q + w4*P + w5*Pop + w6*Pr + R\_0$, where

Q=Quality of the given product or service,
   Pr=Preference for the given product or service,
   P=purchase propensity of the given product or service defined as:
   $P = a1*ap + a2*prp + P\_o$, where ap is an actual purchase and prp is a predictive purchase estimate based on reviews of the given product or service and/or textual attributes of reviews of the given product or service that are predictive of driving sales,
   Pop=popularity of the given product or service measured as follows:
   $Pop = a3*Cl + a4*t + a5*S + Pop\_o$, where Cl=number of click-throughs for the given product or service, t is the time spent by a customer reading information about the given product or service, and S is a number of product or service items already sold, and
   a1, a2, a3, a4, a5, w3, w4, w5, and w6 are coefficients where w3>w4>w5;
   provide the ranked search results on the display based on R as an indication of quality of the associated product or service available for selection by the customer;
   provide an email with a hyperlink to a survey after the customer purchases a product or service, the email including a user ID for the customer and a product ID or a service ID for the purchased product or service, the survey including reviews by other reviewers for the product or service purchased by the customer; and displaying the reviews to the customer to rate the accuracy and helpfulness of the reviews by other reviewers in the customer's purchase decision and the customer's satisfaction with the product or service;
   receive from the customer ratings of the reviews of the purchased product or service by the other reviewers;
   adjust the customer's ratings of the reviews of the purchased product or service from the other reviewers based on a weighting representative of a reputation of the customer for accuracy and helpfulness where the weighting is based at least in part on previous reviews of other products or services by the customer and ratings of the previous reviews by other reviewers.

2. The system of claim 1, wherein the memory further includes instructions that when executed by the processor cause the processor further to:
   provide reviews on products or services available for purchase through the interface, wherein product or service reviews are displayed based on the reputation weightings of the reviewers who reviewed the products or services; and
   update a reputation weighting of a product or service reviewer that provided a review of the product or service that was purchased by the customer in accordance with the customer's review of the reviewer's review of the purchased product or service.

3. The system of claim 2, further comprising instructions that when executed by the processor cause the processor further to rank the search results based on the product or service reviews, social conscience factors, and/or other factors the customer initiating the search for products or services deems important in the search results.

4. The system of claim 1, further comprising instructions that when executed by the processor cause the processor further to reimburse a reviewer when the reviewer's review led to a purchase of a product or service by the customer.

5. The system of claim 4, further comprising instructions that when executed by the processor cause the processor further to read a bar code to determine the product ID for the product purchased by the customer, to identify and correlate the product purchase as having been attributable to the fact that the customer previously read a review of the product, and to enable compensation back to the reviewer who prepared the review of the product.

6. The system of claim 2, further comprising instructions that when executed by the processor cause the processor further to implement a collaborative filter that identities which attributes are most significant in predicting preferences of any given customer within a domain, determines who the reviewers are who are most closely correlated to the given customer according to those attributes, and then re-ranks the products or services according to predicted ratings of the closely correlated reviewers.

7. The system of claim 3, further comprising instructions that when executed by the processor cause the processor further to calculate a score for ranking products or services in the search results based on at least one of the following social conscience factors:
   a degree to which the product or service is friendly to the environment,
   treatment of women and minorities by the provider of the product or service,
   a percentage of women in senior management positions and on the board of the provider of the product or service,
   granting paid maternity leave to women of at least six weeks by the provider of the product or service,
   granting time off with pay to women for emergency child issues by the provider of the product or service,
   lack of use of child laborers by the provider of the product or service,
   permitting stockholders of the provider of the product or service to vote for all directors one by one and/or for an auditor,
   obedience by the provider of the product or service to all federal regulations, and
   philanthropic endeavors or lack thereof by the provider of the product or service.

8. The system of claim 7, further comprising instructions that when executed by the processor cause the processor further to calculate a score for ranking companies that provide the products or services in the search results based on at least one of the social conscience factors.

9. The system of claim 1, further comprising instructions that when executed by the processor cause the processor further to enable the customer to purchase a product or service provided in the ranked search results from a vendor website.

10. The system of claim 9, further comprising instructions that when executed by the processor cause the processor further to enable the customer to purchase the product or service provided in the ranked search results from the vendor website using virtual money, virtual lottery tickets, or a virtual loyalty card.

11. The system of claim 1, wherein the interface is integrated with a social media website.

* * * * *